US011951425B2

(12) United States Patent
Russell

(10) Patent No.: US 11,951,425 B2
(45) Date of Patent: *Apr. 9, 2024

(54) LIQUID FILTRATION SYSTEMS, COMPONENTS, AND METHODS

(71) Applicant: AQUASANA, INC., Austin, TX (US)

(72) Inventor: Wes Russell, Bridgeport, TX (US)

(73) Assignee: A. O. Smith Water Treatment (North America), Inc., Milwaukee, WI (US)

( * ) Notice: Subject to any disclaimer, the term of this patent is extended or adjusted under 35 U.S.C. 154(b) by 1930 days.

This patent is subject to a terminal disclaimer.

(21) Appl. No.: 15/628,263

(22) Filed: Jun. 20, 2017

(65) Prior Publication Data

US 2017/0282102 A1 Oct. 5, 2017

Related U.S. Application Data

(62) Division of application No. 14/160,498, filed on Jan. 21, 2014, now Pat. No. 9,713,781.

(60) Provisional application No. 61/754,843, filed on Jan. 21, 2013.

(51) Int. Cl.
| | | |
|---|---|---|
| *B01D 35/15* | (2006.01) | |
| *B01D 35/153* | (2006.01) | |
| *B01D 35/157* | (2006.01) | |
| *B01D 35/30* | (2006.01) | |
| *C02F 1/00* | (2023.01) | |

(52) U.S. Cl.
CPC ....... *B01D 35/1573* (2013.01); *B01D 35/153* (2013.01); *B01D 35/306* (2013.01); *C02F 1/001* (2013.01); *B01D 2201/291* (2013.01); *B01D 2201/293* (2013.01); *B01D 2201/302* (2013.01); *B01D 2201/4015* (2013.01); *C02F 2201/004* (2013.01); *C02F 2201/006* (2013.01); *C02F 2201/007* (2013.01)

(58) Field of Classification Search
CPC ............. B01D 35/1573; B01D 35/306; B01D 35/153; B01D 2201/302; B01D 2201/4015; C02F 1/001; C02F 2201/004; C02F 2201/006; C02F 2201/007
USPC .................................................. 210/234, 235
See application file for complete search history.

(56) References Cited

U.S. PATENT DOCUMENTS

| | | | |
|---|---|---|---|
| 3,319,791 | A | 5/1967 | Horne |
| 4,077,876 | A | 3/1978 | Southall |
| 4,560,477 | A | 12/1985 | Moldow |
| 5,445,734 | A | 8/1995 | Chen |
| 5,486,288 | A | 1/1996 | Standford et al. |
| 5,591,332 | A | 1/1997 | Reid |
| 5,656,160 | A | 8/1997 | Parise et al. |

(Continued)

FOREIGN PATENT DOCUMENTS

| | | |
|---|---|---|
| CN | 1223160 A | 7/1999 |
| CN | 1072517 | 10/2001 |

(Continued)

OTHER PUBLICATIONS

Extended European Search Report for Application No. 19204581.3 dated Jan. 29, 2020 (7 pages).

(Continued)

*Primary Examiner* — Robert A Hopkins
(74) *Attorney, Agent, or Firm* — Michael Best & Friedrich LLP

(57) ABSTRACT

Filter assemblies, filter modules, and filtration systems and methods.

10 Claims, 40 Drawing Sheets

(56) References Cited

U.S. PATENT DOCUMENTS

| | | | |
|---|---|---|---|
| 5,695,168 A * | 12/1997 | Williams | B01D 27/106 |
| | | | 137/322 |
| 5,707,518 A | 1/1998 | Coates et al. | |
| 5,753,107 A * | 5/1998 | Magnusson | B01D 35/153 |
| | | | 210/109 |
| 5,798,041 A | 8/1998 | Zuk, Jr. | |
| 5,833,850 A | 11/1998 | Liu | |
| 5,858,215 A | 1/1999 | Burchard | |
| 5,914,037 A | 6/1999 | Yen | |
| 6,001,249 A | 12/1999 | Bailey et al. | |
| 6,027,644 A | 2/2000 | Magnusson et al. | |
| D421,649 S | 3/2000 | Cappuyns | |
| 6,120,685 A | 9/2000 | Carlson et al. | |
| 6,139,739 A | 10/2000 | Hamlin et al. | |
| 6,193,884 B1 | 2/2001 | Magnuson et al. | |
| 6,325,929 B1 | 12/2001 | Bassett | |
| 6,360,764 B1 | 3/2002 | Fritze | |
| D470,216 S | 2/2003 | Gustafson et al. | |
| D481,101 S | 10/2003 | Boehrs et al. | |
| D497,972 S | 11/2004 | Reynolds et al. | |
| 7,022,228 B2 | 4/2006 | Hennes et al. | |
| 7,147,772 B2 | 12/2006 | Fritze | |
| 7,147,773 B2 | 12/2006 | Mitchell et al. | |
| 7,186,338 B2 | 3/2007 | Boisvert | |
| 7,264,718 B2 | 9/2007 | Knoll et al. | |
| D571,433 S | 6/2008 | Koteskey | |
| 7,387,726 B2 | 6/2008 | Wolf et al. | |
| 7,407,148 B2 | 8/2008 | Bassett et al. | |
| 7,435,347 B2 | 10/2008 | Klein | |
| 7,442,301 B2 | 10/2008 | Huda | |
| 7,476,314 B2 | 1/2009 | Reid | |
| 7,481,928 B2 | 1/2009 | Fritze | |
| 7,501,057 B1 | 3/2009 | Go | |
| 7,506,666 B2 | 3/2009 | Tubby | |
| 7,517,449 B2 | 4/2009 | Choi | |
| 7,540,957 B1 | 6/2009 | Kurth et al. | |
| 7,610,932 B2 | 11/2009 | Olson et al. | |
| 7,638,042 B2 | 12/2009 | Astle et al. | |
| D609,775 S | 2/2010 | Zukor | |
| 7,662,283 B2 | 2/2010 | Eserkaln et al. | |
| 7,695,619 B2 | 4/2010 | Kurth et al. | |
| 7,722,766 B2 | 5/2010 | Namur | |
| 7,736,503 B2 | 6/2010 | Kennedy et al. | |
| 7,736,504 B2 | 6/2010 | Fritze et al. | |
| 7,744,757 B1 | 6/2010 | Liao | |
| 7,763,170 B2 | 7/2010 | Bassett et al. | |
| 7,799,220 B2 | 9/2010 | Fritze | |
| 7,837,876 B2 | 11/2010 | Ye et al. | |
| 7,862,720 B2 | 1/2011 | Brown | |
| 7,909,997 B2 | 3/2011 | Stoick | |
| 8,197,686 B2 | 6/2012 | Richmond | |
| 8,955,349 B2 | 2/2015 | Mitchell | |
| D724,179 S | 3/2015 | Keenan et al. | |
| D746,969 S | 1/2016 | Leatzow et al. | |
| D759,195 S | 6/2016 | Tanida et al. | |
| 9,447,758 B2 | 9/2016 | Girondi | |
| D770,592 S | 11/2016 | Schwartz et al. | |
| D772,379 S | 11/2016 | Tadlock et al. | |
| 2004/0251192 A1 | 12/2004 | Fritze | |
| 2005/0092673 A1 | 5/2005 | Fritze | |
| 2006/0091047 A1 | 5/2006 | Ye | |
| 2007/0187316 A1 | 8/2007 | Weinberger et al. | |
| 2007/0227963 A1 | 10/2007 | Fick et al. | |
| 2008/0073262 A1 | 3/2008 | Richmond | |
| 2008/0179235 A1 | 7/2008 | Hacker et al. | |
| 2008/0185330 A1 | 8/2008 | Sinur et al. | |
| 2008/0245719 A1 | 10/2008 | Beard et al. | |
| 2010/0025317 A1 | 2/2010 | Fall et al. | |
| 2010/0170857 A1 | 7/2010 | Williams et al. | |
| 2010/0213115 A1 | 8/2010 | Thomas | |
| 2010/0276358 A1 | 11/2010 | Thomas | |
| 2011/0024344 A1 | 2/2011 | Thomas et al. | |
| 2012/0267293 A1 | 10/2012 | Ardes | |

FOREIGN PATENT DOCUMENTS

| | | |
|---|---|---|
| CN | 1547500 | 11/2004 |
| CN | 101031345 | 9/2007 |
| CN | 101716440 | 6/2010 |
| DE | 102009054523 | 6/2011 |
| JP | 2009297714 A | 12/2009 |
| WO | 2002078816 A1 | 10/2002 |
| WO | WO2006081542 | 8/2006 |
| WO | WO2009018454 | 2/2009 |
| WO | 2010123344 A1 | 10/2010 |
| WO | WO2011056857 | 5/2011 |
| WO | WO2011079884 | 7/2011 |
| WO | 2011117693 A1 | 9/2011 |

OTHER PUBLICATIONS

Culligan®, "Easy-change Under-Sink Drinking Water Filter System Installation and Operating Instructions Model US-EZ", Culligan International company, 7 pages, 2006.

Office Action from the Canadian Intellectual Property Office for Application No. 2,880,601 dated Mar. 5, 2015 (3 pages).

First Office Action from the State Intellectual Property Office of China for Application No. 201480002173.5 dated Dec. 30, 2015 (10 pages).

Second Office Action from the State Intellectual Property Office of China for Application No. 201480002173.5 dated Aug. 30, 2016 ( 15 pages).

International Search Report and Written Opinion issued in PCT/US2014/012290, dated May 27, 2014.

EP14741165.6 Extended European Search Report dated Jan. 30, 2017 (6 pages).

Third Office Action from The State Intellectual Property Office of the People's Republic of China for Application No. J01480002173.5 dated Feb. 15, 2017 (11 pages).

EP14741165.6 Extended European Search Report dated May 30, 2017 (13 pages).

Chinese Patent Office action for Application No. 201710711481.0 dated Dec. 11, 2019 (15 pages including English translation).

Office Action from the State Intellectual Property Office of the People's Republic of China for Application No. 201710711481.0 dated Jun. 5, 2020 (7 pages including English machine translation).

Chinese Patent Office Action for Application No. 201710711481.0 dated Apr. 17, 2019 (19 pages, English translation included).

Canadian Patent Office Action for Application No. 2,880,601 dated Aug. 28, 2018 (3 pages).

Canadian Patent Office Action for Application No. 2,880,601 dated Dec. 18, 2017 (4 pages).

European Patent Office Examination Report for Application No. 19204581.3 dated Jul. 7, 2021 (4 pages).

United States Patent Office Notice of References Cited for U.S. Appl. No. 29/794,572 dated Feb. 23, 2024 (1 page).

* cited by examiner

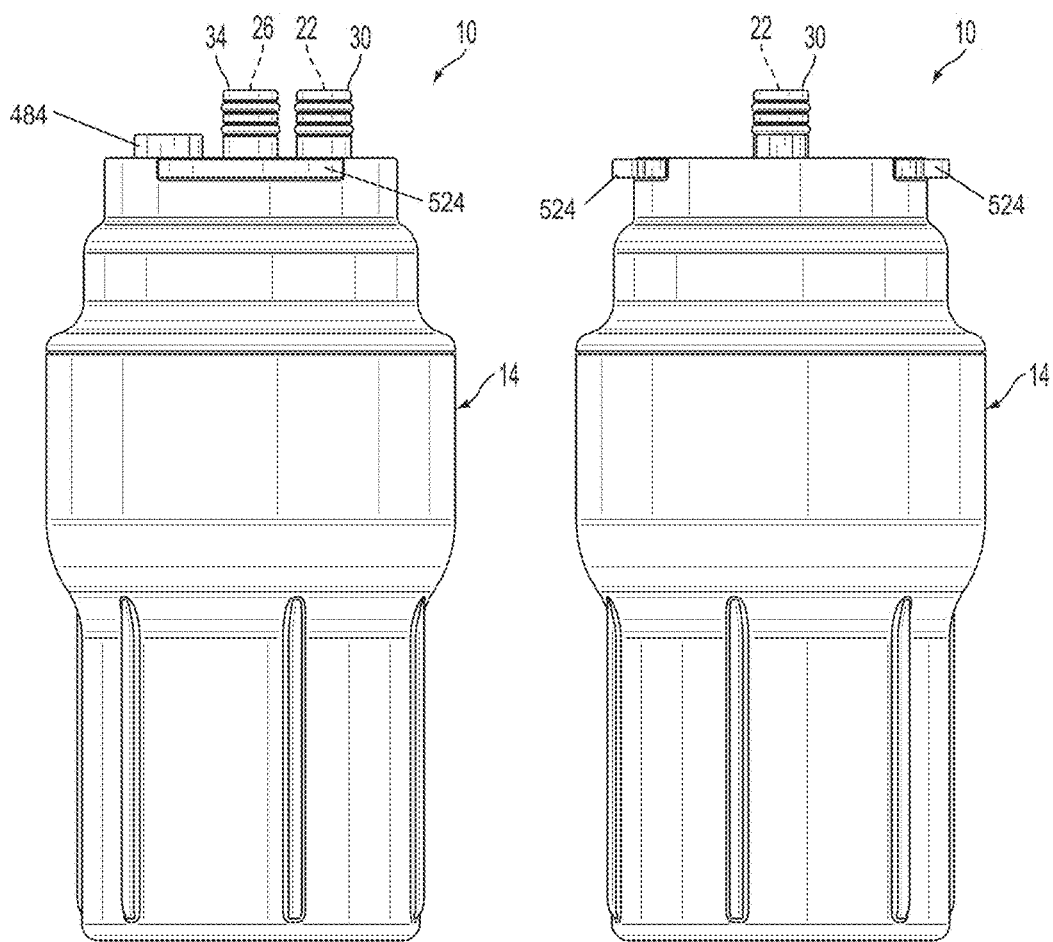

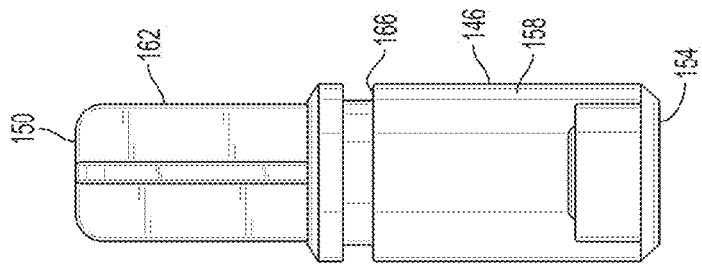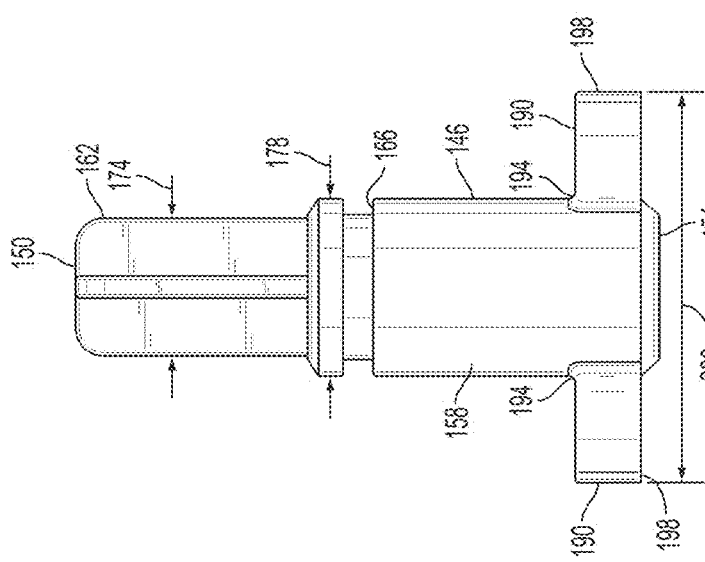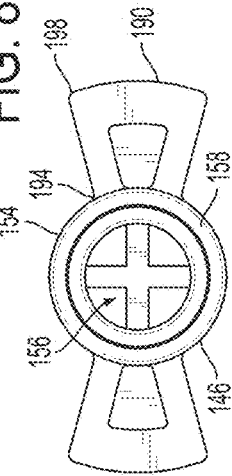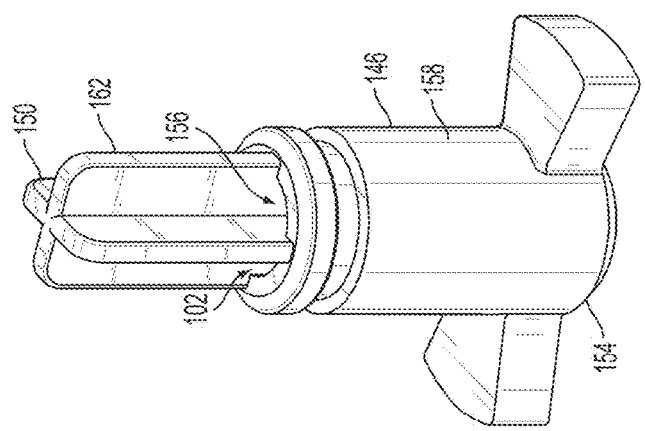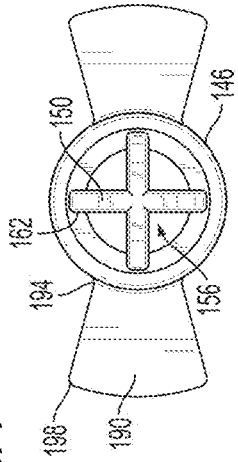

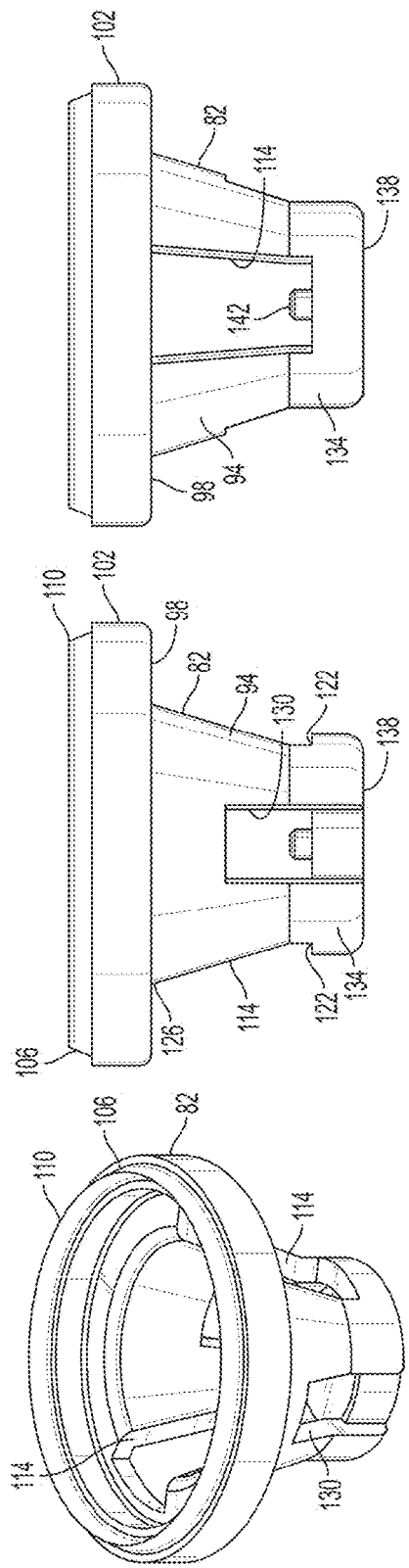
FIG. 9A
FIG. 9B
FIG. 9C
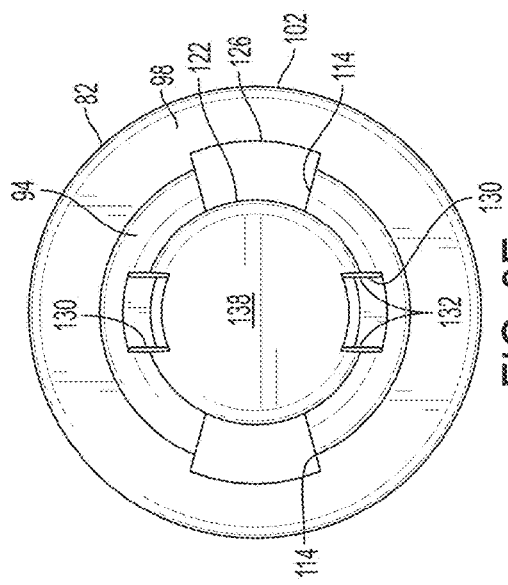
FIG. 9D
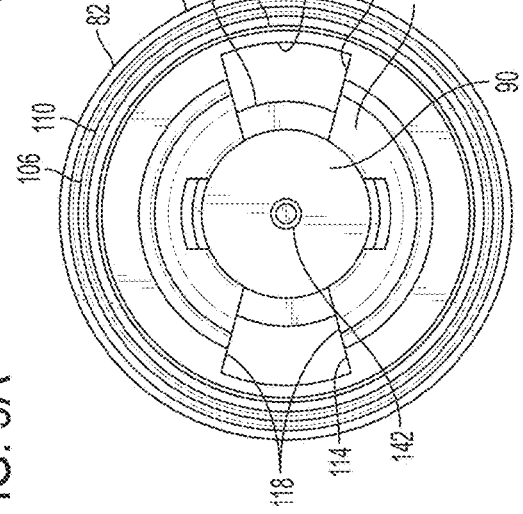
FIG. 9E

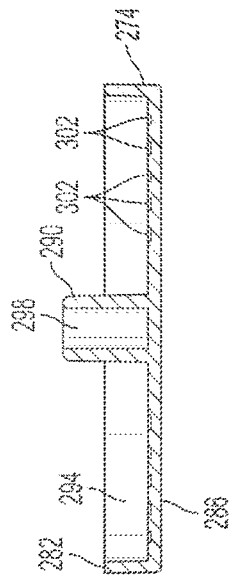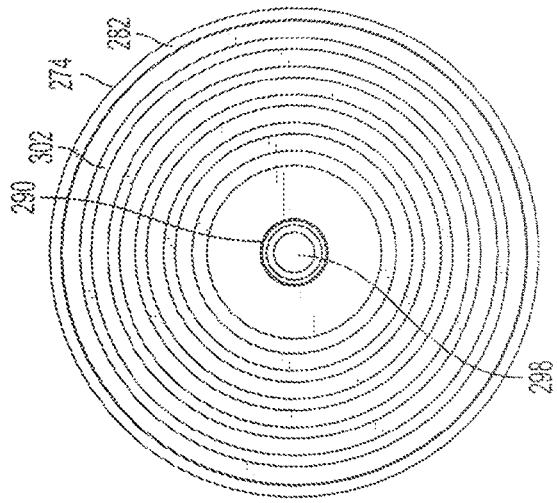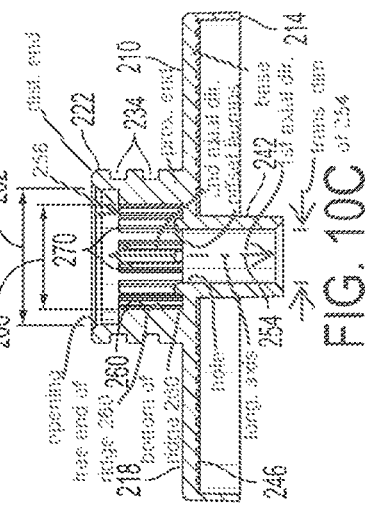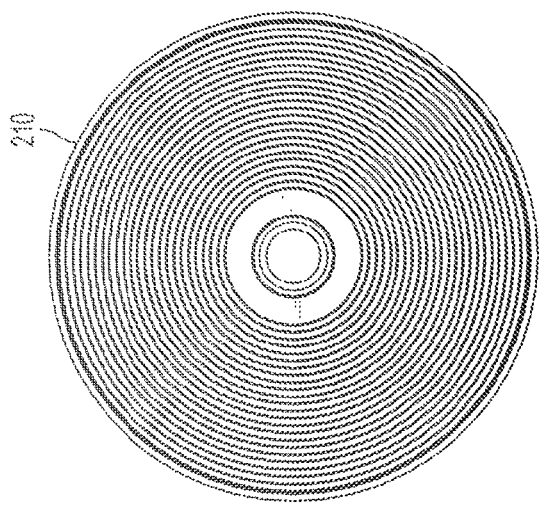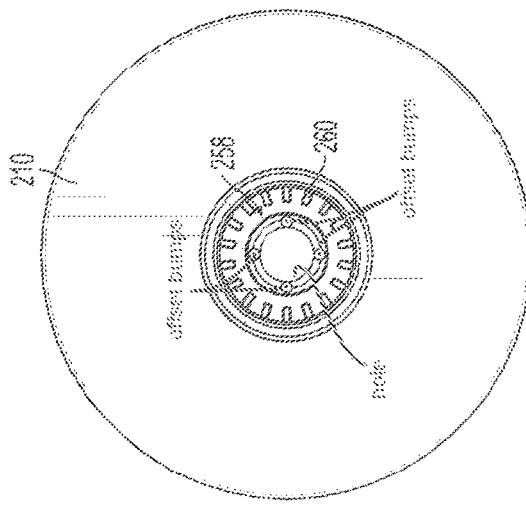

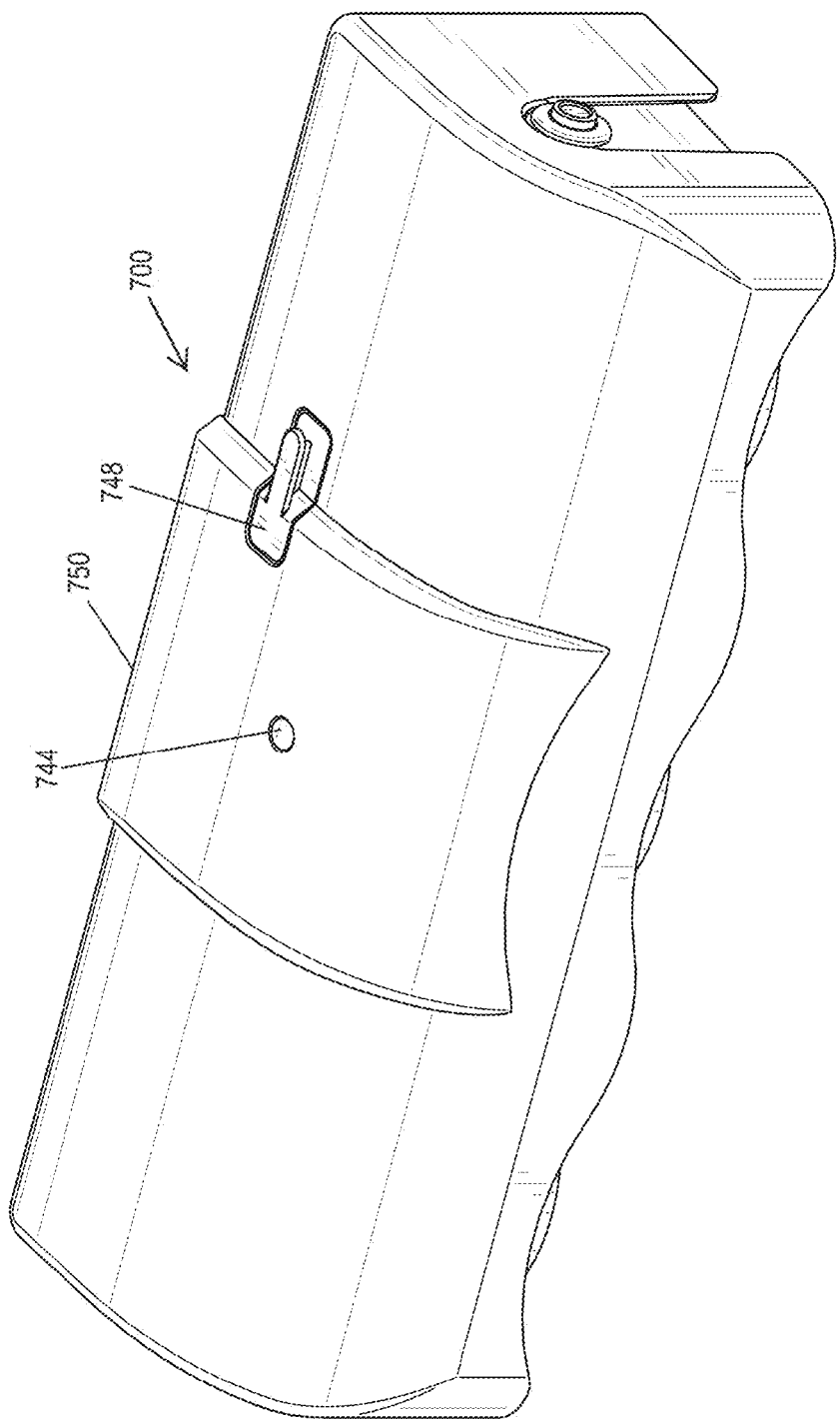

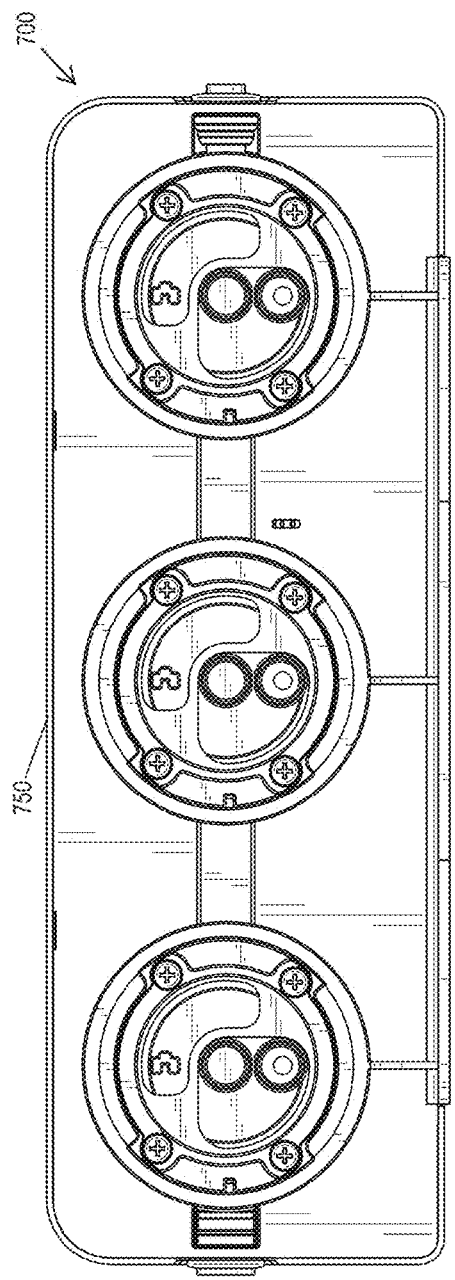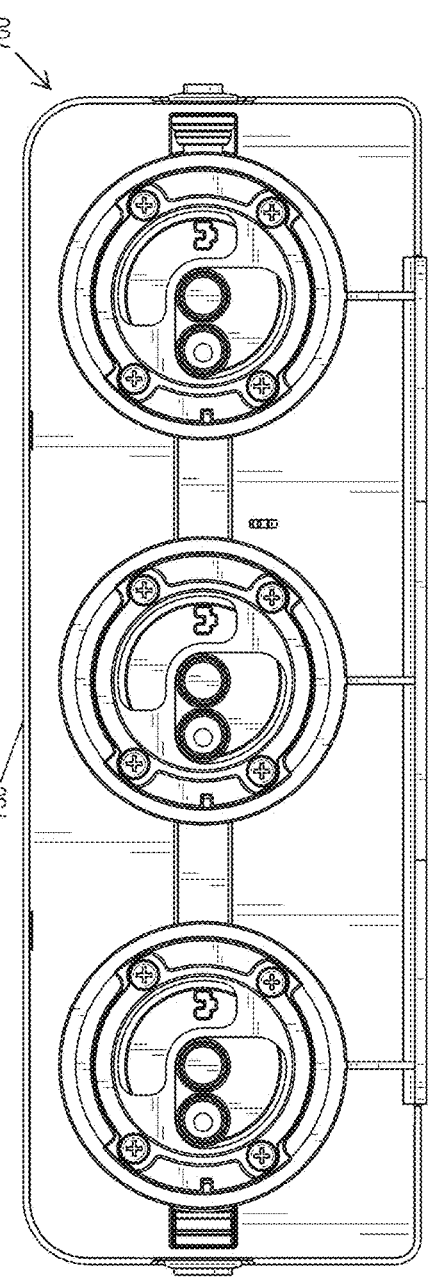
FIG. 35A
FIG. 35B

LIQUID FILTRATION SYSTEMS, COMPONENTS, AND METHODS

CROSS-REFERENCE TO RELATED APPLICATIONS

This application is a Division of U.S. patent application Ser. No. 14/160,498, filed Jan. 21, 2014, which claims priority to U.S. Provisional Application No. 61/754,843, filed Jan. 21, 2013, the entire contents of both of which are specifically incorporated by reference without disclaimer.

BACKGROUND

1. Field of the Invention

The present invention relates generally to liquid filtration, more particularly, but not by way of limitation, to liquid filtration systems, components, and methods with improved housing, filter, and filter-cap configurations (e.g., for facilitating filter replacement).

2. Description of Related Art

Examples of filtration systems are disclosed in: (1) U.S. Pat. No. 5,486,288; (2) U.S. Pat. No. 7,147,772; and (3) U.S. patent application Ser. No. 11/013,269, filed Dec. 14, 2004, and published as Pub. No. US 2005/0092673.

SUMMARY

This disclosure includes embodiments of filtration systems, assemblies, apparatuses, and methods.

In some constructions, the disclosure provides a filtration system including a filter having a passageway. The filtration system further includes a filter housing including a first housing portion and a second housing portion couplable to the first housing portion. The second housing portion includes a connection portion having a filter inlet, a filter outlet, and a filter valve coupled to at least one of the filter inlet and the filter outlet. The filtration system further includes a cap having an inner side engagable with the filter, an outer side engagable with the filter valve, a generally cylindrical outer projection including a peripheral groove configured to receive a seal, an inner projection, and a passageway extending through the outer projection and the inner projection to permit water to flow between the inner side and the outer side. The passageway has an outer passageway portion formed in the outer projection and an inner passageway portion formed in the inner projection. The outer passageway portion includes a first transverse dimension and a second transverse dimension that is smaller than and inward of the first transverse dimension.

In another construction, the disclosure provides a method of assembling a filtration system, the method including providing a filter having a passageway. The method further includes providing a cap, the cap having an inner side, an outer side, a generally cylindrical outer projection including a peripheral groove configured to receive a seal, an inner projection, and a passageway extending through the outer projection and the inner projection to permit water to flow between the inner side and the outer side. The passageway has an outer passageway portion formed in the outer projection and an inner passageway portion formed in the inner projection. The outer passageway portion includes a first transverse dimension and a second transverse dimension that is smaller than and inward of the first transverse dimension. The method further includes engaging the inner side of the cap to an end of the filter. The method further includes positioning the filter and the cap within a filter chamber defined by a filter housing including a first housing portion and a second housing portion. The second housing portion includes a connection portion having a filter inlet, a filter outlet, and a filter valve coupled to at least one of the filter inlet and the filter outlet. The method further includes engaging the first housing portion with the second housing portion.

In another construction, the disclosure provides a filter assembly for use with a filter housing having a filter chamber, the filter housing including a first housing member; a second housing member configured to be coupled to the first housing member and having a connection portion with an inner side and an outer side, the outer side configured to face away from the filter chamber, the outer side having a filter inlet and a filter outlet; and a filter valve coupled to at least one of the filter inlet and the filter outlet. The filter valve is biased toward a closed configuration in which fluid communication is substantially prevented through the filter valve. The filter valve comprises a valve body having a bore and a plunger. The valve body is fixed relative to the housing. The filter assembly includes a filter configured to be disposed in the filter chamber and a filter cap engagable with the filter and configured to be positioned between the plunger of the filter valve and the filter to maintain the filter valve in an open position such that fluid communication is permitted through the filter valve between the filter chamber and at least one of the filter inlet and the filter outlet. The filter cap includes an outer side including an outer projection including an engagement portion configured to engage the connection portion to move the filter valve into the open position. The filter cap further includes an inner side configured to receive the filter and including an inner projection. The filter cap further includes a passageway extending through the outer projection and the inner projection to permit water to flow between the inner side and the outer side, the passageway having an outer passageway portion formed in the outer projection and an inner passageway portion formed in the inner projection, the outer passageway portion including a first transverse dimension and at least one second transverse dimension that is smaller than and inward of the first transverse dimension.

Any embodiment of any of the present systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiments depicted in the figures.

FIGS. 1-7 are various views of one embodiment of the present filter modules including a filter housing and a filter disposed in the filter housing, and suitable for use in and/or with some embodiments of the present filtration assemblies.

FIGS. 8A-8E are various views of a plunger for use in a valve assembly of some embodiments of the present filter housings.

FIGS. 9A-9E are various views of a valve body for use with the plunger of FIGS. 8A-8E in a valve assembly of some embodiments of the present filter housings.

FIGS. 10A-10C are various views of a first filter cap configured for use in the filter module of FIGS. 1-7.

FIGS. 11A-11B are various views of a second filter cap configured for use in the filter module of FIGS. 1-7.

FIGS. 30 and 31-37D are various views of a third embodiment of the present manifold assemblies for use with three of the filter module of FIGS. 1-7 in some embodiments of the present filtration systems.

DESCRIPTION OF ILLUSTRATIVE EMBODIMENTS

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a structure (e.g., a component of an apparatus) that is configured in a certain way is configured in at least that way, but it can also be configured in other ways than those specifically described.

Figures 1, 4:
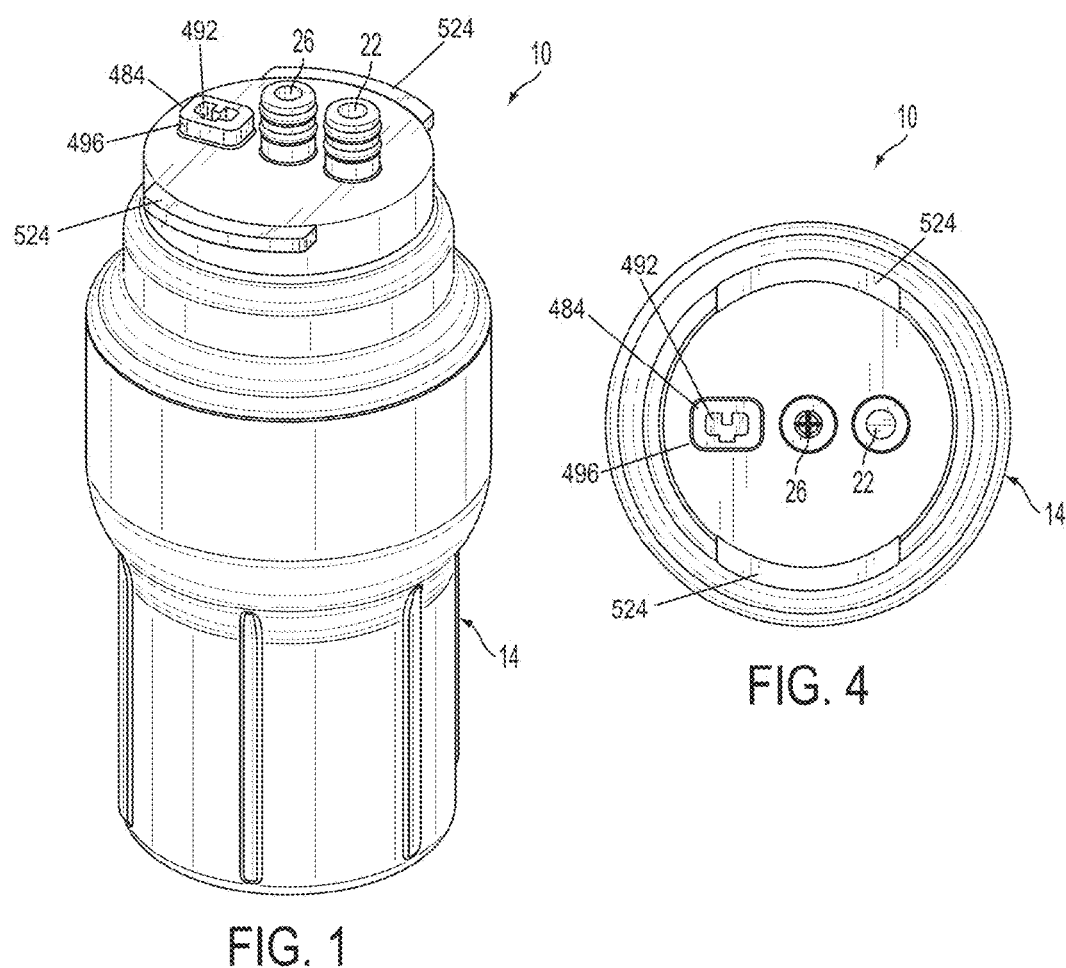
Figure 5:
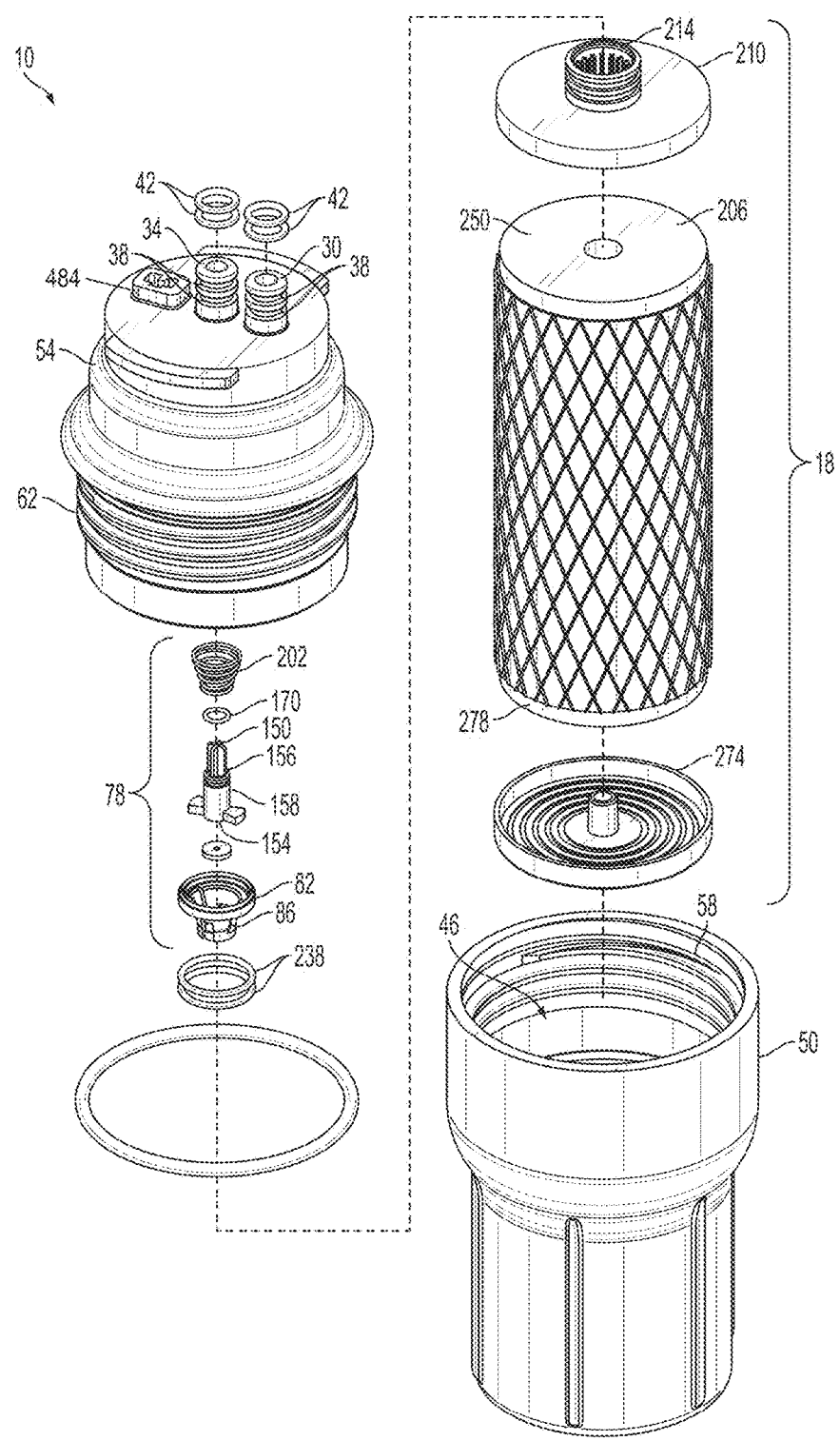
Figure 6A:
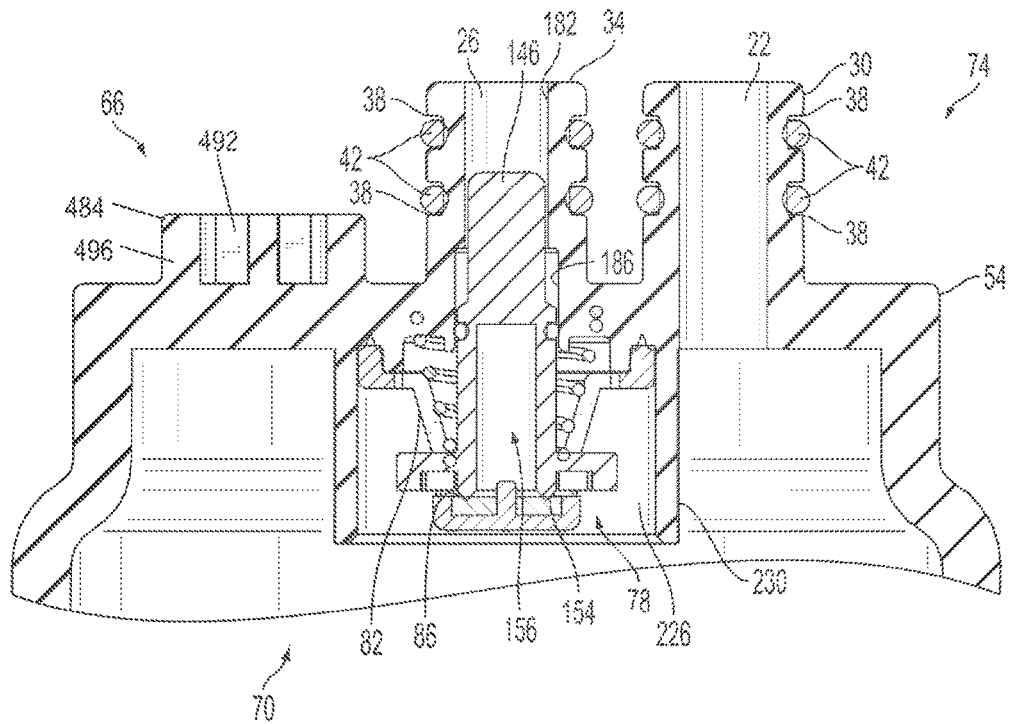
Figure 6B:
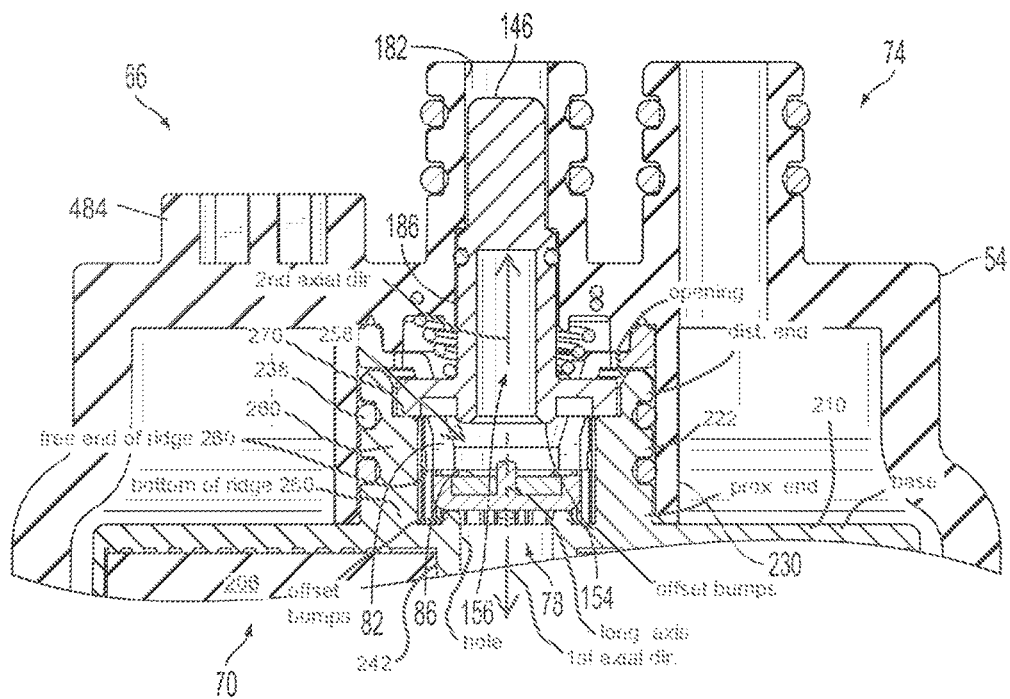
Figure 7:
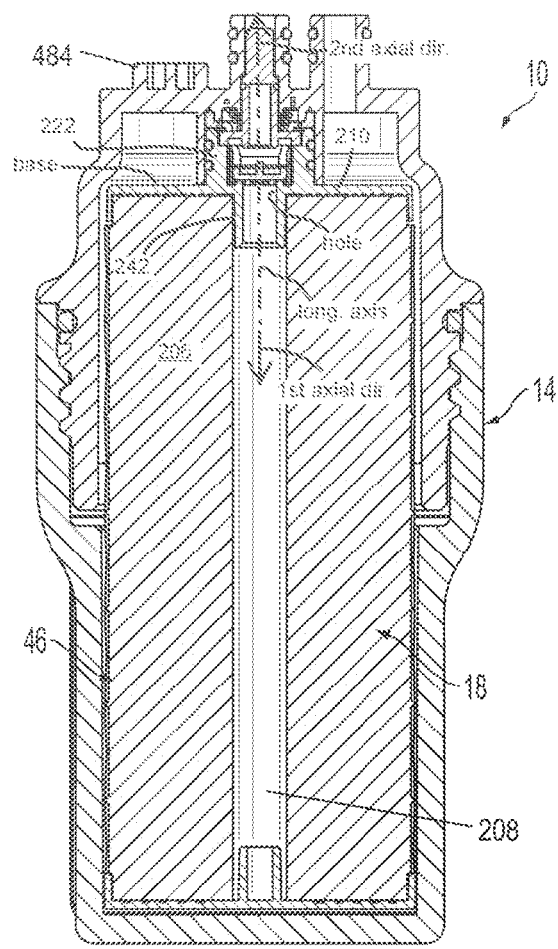

Referring now to the drawings, and more particularly to FIGS. 1-11B, shown therein and designated by reference numeral 10 is an embodiment of the present filter modules and its components, such as may be used, for example, for filtering tap water for drinking and the like (e.g., in at least some embodiments of the present filtration systems, as described below). FIG. 1 depicts a perspective view of filter module 10; FIGS. 2 and 3 depict side views of filter module 10; FIG. 4 depicts a top view of filter module 10; FIG. 5 depicts an exploded perspective view of filter module 10; FIGS. 6A-6B depict enlarged side cross-sectional views of an upper portion of filter module 10; and FIG. 7 depicts a side cross-sectional view of filter module 10. In the embodiment shown, filter module 10 comprises a filter housing 14, and a filter assembly 18. Filter housing 14 is configured to be coupled to (e.g., and/or receive, as shown) filter assembly 18, and includes a filter inlet 22 configured to receive a liquid to be filtered, and a filter outlet 26 configured to permit filtered liquid to exit the filter housing. In the embodiment shown, inlet 22 and outlet 26 each comprises a projection (e.g., a nipple) 30 or 34, respectively, having a circular cross-sectional shape and one or more (e.g., two, as shown) annular depressions or grooves 38, with each groove 38 configured to receive an O-ring 42, as shown. In other embodiments, inlet 22 and outlet 26 can comprise or extend through any suitable fittings (e.g., fittings with a square cross-sectional shape, etc.).

In the embodiment shown, housing 14 comprises a filter chamber 46, a first housing member 50, and a second housing member 54 configured to be coupled to first housing member 50 (e.g., via corresponding threaded portions 58 and 62). In this embodiment, second housing member 54 has a connection portion 66 with an inner side 70 and an outer side 74 that is configured to face away from filter chamber 46. As shown, outer side 74 includes filter inlet 22 and filter outlet 26 (and projections or fittings 30 and 34). In the embodiment shown, filter module 10 further comprises a filter valve 78 coupled to at least one of the filter inlet and the filter outlet (e.g., to filter inlet 22, as shown). In some embodiments, such as the one shown, filter valve 78 has a closed configuration (FIG. 6A) in which liquid is substantially prevented from flowing through the filter valve, and an open configuration (FIG. 6B) in which liquid is permitted to flow through the filter valve, and filter valve 78 is biased toward the closed configuration. For example, in the embodiment shown, filter valve 78 comprises a valve body 82 having a valve seat 86 (e.g., having a rubber or other resilient seat surface, such as may be provided by a washer 90) and is coupled in fixed relation to second housing member 54.

In this embodiment, and as shown in detail in FIGS. 9A (perspective view), 9B-9C (side views), 9D (top view), and 9E (bottom view), valve body 82 comprises a frusto-conical lower portion 94 having a flange 98 extending radially outward from the larger upper end of the frusto-conical lower portion 94, and a cylindrical wall 102 extending upward from flange 98. In this embodiment, an upper end 106 of cylindrical wall 102 includes an upper edge 110 defined by a triangular cross-sectional shape of the cylindrical wall. In this embodiment, cylindrical wall 102 is configured to fit around (e.g., in a press-fit relationship) a corresponding cylindrical portion of second housing member 54 and/or into a corresponding groove in second housing member 54 (e.g., as shown in FIGS. 6A-6B). In the embodiment shown, valve body 82 includes a pair of guide slots 114 extending vertically along a majority (e.g., all) of the height of, and on opposite sides of, frusto-conical lower portion 94. As shown, sides 118 of guide slots 114 can be non-parallel (relative to each other), such as, for example, with radially inner portions of opposing sides 122 being closer together than radially outer portions of opposing sides 122. In this embodiment, lower (and radially inward) ends 122 of guide slots 114 are narrower than upper (and radially outward) ends 126 of guide slots 114, and the portion of guide slots 114 disposed in frusto-conical lower portion 94 linearly transition between the respective widths of lower ends 122 and upper ends 126.

In this embodiment, valve body 82 also includes a pair of valve openings 130 disposed on opposite sides of a lower part of the height of frusto-conical lower portion 94, each disposed between guide slots 114. In addition to valve openings 130, guide slots 114 are also configured to permit liquid to flow through the lower portions of the guide slots when the filter valve is in the open configuration (FIG. 6B). As shown, sides 132 of valve openings 130 can be parallel (relative to each other), such as, for example, with radially inner portions of opposing sides 132 being substantially the same distance apart as are radially outer portions of opposing sides 132. In the embodiment shown, valve body 82 also includes a lower cylindrical portion 134 extending downward from the smaller lower end of the frusto-conical portion, and a bottom wall 138 extending across the bottom of cylindrical portion 134 to retain washer 90. In this embodiment, valve body 82 also includes a central post 142 extending upward from the center of bottom wall 138, as shown, and configured to center and/or retain washer 90 and to center a plunger 146 of the filter valve when the filter valve is in the closed configuration (FIG. 6A).

In this embodiment, and as shown in detail in FIGS. 8A (perspective view), 8B-8C (side views), 8D (top view), and 8E (bottom view), plunger 146 has a first end 150, a second end 154, and a passageway 156 extending through the plunger and the second end. Plunger 146 is configured to be slidably coupled to valve body 82 such that the plunger is movable between an open position (FIG. 6B) in which second end 154 of the plunger is spaced apart from valve seat 86 and a closed position (FIG. 6A) in which second end 154 of the plunger is pressed against valve seat 86. In the embodiment shown, plunger 146 includes a hollow cylindrical portion 158 extending from second end 154 toward first end 150, and a divided extension portion 162 extending from cylindrical body portion 158 to first end 150. In this embodiment, extension portion 162 has an X-shaped cross-section with four symmetrical quadrants around its longitudinal axis. In other embodiments, extension portion 162 can have any suitable cross-sectional shape. In the embodiment shown, cylindrical portion 158 includes a groove 166 that is closer to extension portion 162 than to second end 154, and is configured to receive an O-ring 170 to provide a movable seal between cylindrical portion 158 and second housing portion 54 when plunger 146 is disposed in filter inlet 22. In this embodiment, extension portion has a maximum transverse dimension 174 that is smaller than a maximum transverse dimension (diameter) 178 of cylindrical portion 158. As used here, "maximum" does not imply that extension portion 162 must have multiple, differing transverse dimensions (it need not); "maximum" instead means that, should extension portion 162 have multiple such transverse dimensions, no such transverse dimension is larger than maximum dimension 174 (the term "maximum" is used in this same way throughout this disclosure). In the embodiment shown, filter inlet 22 has an outer portion 182 with diameter that corresponds to dimension 174 (e.g., is larger than dimension 174 but smaller than dimension 178), and an inner portion 186 with a diameter that corresponds to dimension 178 (e.g., is larger than dimension 178 but smaller than an uncompressed dimension of O-ring 170 when O-ring 170 is disposed around plunger 146 in groove 166). Cylindrical portion 158 and extension portion 162 (and their respective maximum transverse dimensions 174 and 178) are configured to center plunger 146 in filter inlet 22 to ensure that plunger 146 can freely slide between its open and closed positions, as shown in FIGS. 6A-6B.

In the embodiment shown, plunger 146 also includes lateral projections 190 extending radially outward from cylindrical portion 158. As shown, projections 190 each includes an inner end 194 having a width corresponding to (e.g., less than) the width of lower end 122 of each guide slots 114 in valve body 82, and an outer end 198 having a width corresponding to (e.g., less than) the width of upper end 126 of each guide slot 114. Because upper ends 126 of guide slots 114 are radially outward of lower ends 122, projections 190 of plunger 146 are configured to permit plunger 146 to slide linearly along a longitudinal axis of plunger 146 relative to valve body 82 while helping to maintain the plunger in a centered position (resist deflection of second end 154 of the plunger) relative to the valve body. In the embodiment shown, filter valve 78 also comprises a spring 202 configured to bias the plunger toward the closed position. For example, spring 202 can be compressed and disposed between lateral projections 190 of the plunger and inner side 70 of second housing member 54 such that the tendency of spring 202 to expand to its resting state pushes the plunger away from inner side 70 of the second housing member. In this embodiment, filter valve 78 is configured to permit fluid communication through passageway 156 of plunger 146 if the plunger is in the open position (FIG. 6B).

In the embodiment shown, filter assembly 18 comprises a filter 206 having a central longitudinal passage 208 and configured to be disposed in filter chamber 46, and a first filter cap 210. In some embodiments, such as the one shown, first filter cap 210 is configured to be disposed between connection portion 66 (e.g., inner side 70 of connection portion 66) of second housing member 54 and filter 206 to maintain filter valve 78 in the open position (FIG. 6B) such that fluid communication is permitted through filter valve 78 between filter chamber 46 and at least one of filter inlet 22 and filter outlet 26. For example, in the embodiment shown, first filter cap 210 is configured to be disposed between filter 206 and inner side 70 of connection portion 66 to maintain filter valve 78 in the open position such that fluid communication (e.g., liquid flow) is permitted through filter valve 78 between filter inlet 22 and filter chamber 46. In the embodiment shown, filter 206 can be similar in any of its construction and/or materials to the filter found in the Model AQ-4000, AQ-4025, or AQ-4035 filter assemblies (e.g., Cartridge A and/or Cartridge B of either Model) available from Aquasana, Inc., Austin, Texas, USA. As such, the filters of filter assembly 18 may (like the filters in the Aquasana, Inc. filter assemblies models just described) comprise carbon, and, more specifically, may be characterizable as activated carbon filtration filters (such as those configured to remove impurities from water), and/or may have one or more of the following features: an operating pressure range of 20-50 pounds per square inch, a rated capacity of 500 gallons, a maximum operating temperature of 90 degrees Fahrenheit, a maximum flow rate of 0.4 gallons per minute.

In this embodiment, and as shown detail in FIGS. 10A (top view), 10B (bottom view), and 10C (side cross-sectional view), first filter cap 210 has a first or inner end 214 configured to face filter 206, and a second or external end 218 configured to face away from filter 206. In the embodiment shown, filter cap 210 includes generally cylindrical projection 222 projecting from second end 218, and configured to extend into a recess 226 (e.g., defined by a cylindrical wall 230) of second housing member 54 if filter assembly 18 is disposed in filter chamber 46. In the embodiment shown, projection 222 includes one or more (e.g., two, as shown) peripheral grooves 234, each configured to receive an O-ring 238 to provide a seal between projection 222 and the surface of second housing member 54 (e.g., the inner surface of cylindrical wall 230, as shown) that defines recess 226. In the embodiment shown, inner end 214 of filter cap 210 includes a cylindrical projection 242 configured to extend into the central passageway of filter 206 (e.g., the outer diameter of projection 242 is substantially equal to the inner diameter of the central passageway in filter 206), and an annular recess 246 configured to receive a first end 250 of filter 206 (e.g., with an outer diameter substantially equal to the outer diameter of filter 206), both to help ensure that substantially all water flowing through the filter inlet into the central passageway of filter 206 will flow through the cylindrical outer wall of filter 206 (as described in more detail below), and to help ensure that filter 206 can be securely coupled in fixed relation to filter cap 210, at least when filter assembly 18 is disposed in filter chamber 46. As shown, filter cap 210 further includes a passageway 254 extending through projection 222 and projection 242 to permit water to flow through first filter cap 210, as described in more detail below.

In some embodiments, outer side 218 (e.g., projection 222) of first filter cap 210 includes a recess 258 with a first transverse dimension 262 and at least one second transverse dimension 266 that is smaller than first transverse dimension 262 and closer to the end of inner projection 242 than is first transverse dimension 262. For example, in the embodiment shown, first filter cap 210 includes a plurality of ridges 260 extending radially inward into recess 258 to define second transverse dimension 262, and second transverse dimension is larger than the bottom cylindrical portion 134 of valve body 82, but is smaller than a maximum transverse dimension 266 of plunger 146 (e.g., defined by lateral projections 190), such that lower cylindrical portion 134 of valve body 82 can extend into recess 258 beyond upper ends 270 of ridges 260 and but lateral projections 190 cannot extend beyond upper ends 270 of the ridges. As such, if filter valve 78 is fully seated in recess 258 and projection 222 is fully seated in recess 226 (as shown in FIG. 6B), plunger 146 is moved to and/or maintained in its open position to permit liquid to flow through channel 154 of plunger 146 and through valve openings 130 and guide slots 114 of valve body 82.

In this embodiment, and as shown in detail in FIGS. 11A (top view) and 11B (side cross-sectional view), filter assembly 18 can comprise a second filter cap 274 configured to be disposed between a second end 278 of filter 206 and first housing member 50. In the embodiment shown, second filter cap 274 has a first or inner end 282 configured to face filter 206, and a second or external end 286 configured to face away from filter 206. In the embodiment shown, inner end 282 of filter cap 274 includes a cylindrical projection 290 configured to extend into the central passageway of filter 206 (e.g., the outer diameter of projection 290 is substantially equal to the inner diameter of the central passageway in filter 206), and an annular recess 294 configured to receive second end 278 of filter 206 (e.g., with an outer diameter substantially equal to the outer diameter of filter 206), both to help ensure that filter 206 can be securely coupled in fixed relation to filter cap 274, at least when filter assembly 18 disposed in filter chamber 46. As shown, while projection 290 can include a recess 298, filter cap 274 does not include a passageway extending through projection 290, such that water is not permitted flow through cap 274. As shown, outer end 286 of cap 274 can be substantially flat (e.g., to minimize and/or prevent the flow of liquid between second filter cap 274 and first housing member 250), and inner end 282 of cap 274 can include a plurality of circular grooves 302 around projection 290. In other embodiments, second filter cap 274 can be omitted and/or can be unitary with first housing member 50 (e.g., first housing member 50 can include a projection similar to projection 290).

Figure 12:
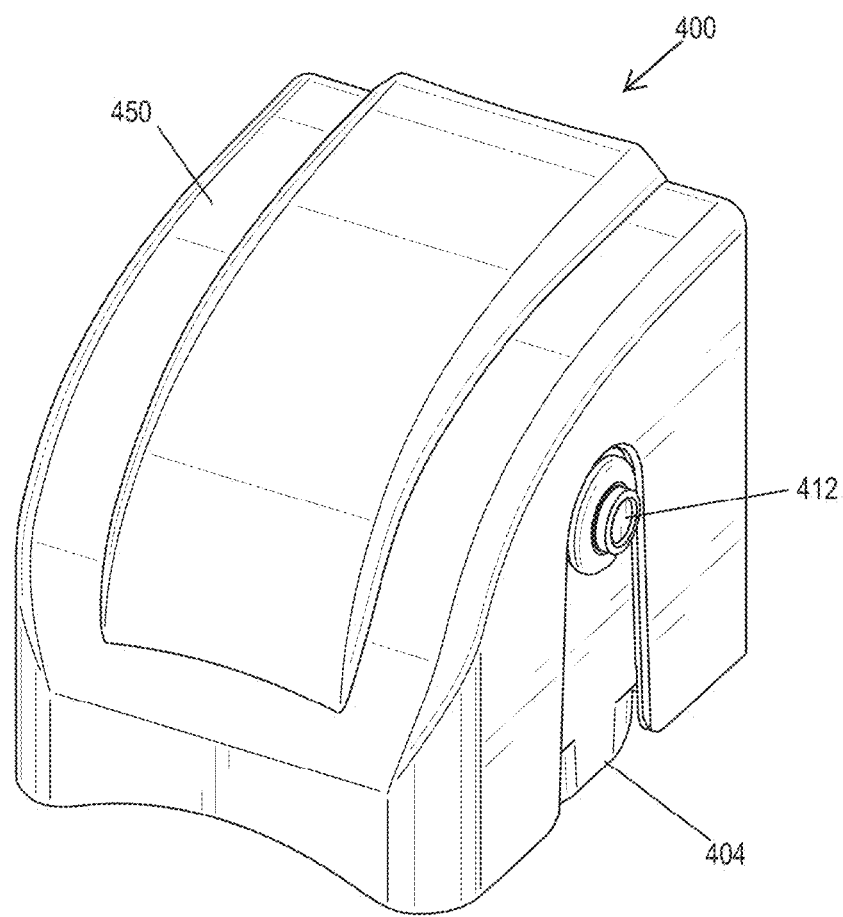
FIGS. 12-19D are various views of a first embodiment of the present manifold assemblies for use with the filter module of FIGS. 1-7 in some embodiments of the present filtration systems.
Figure 13:
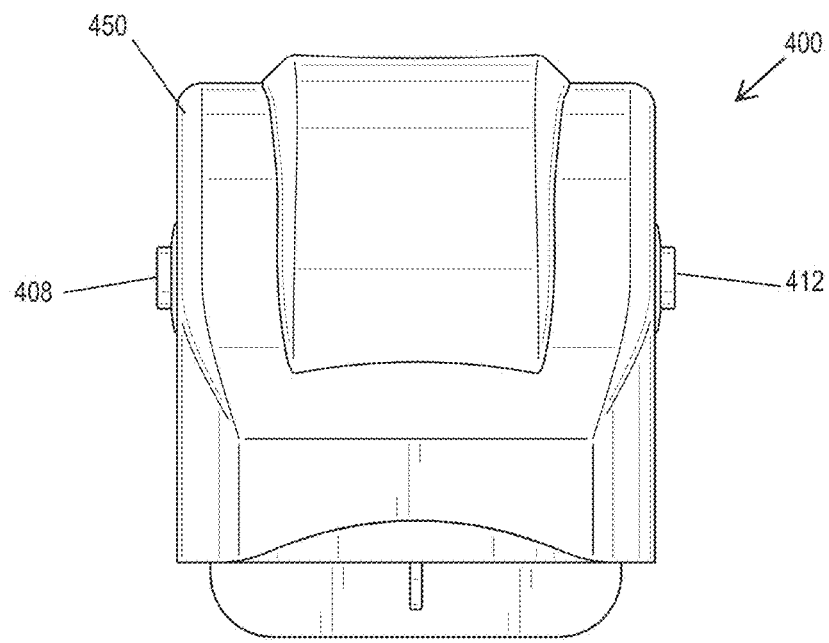
Figure 14:
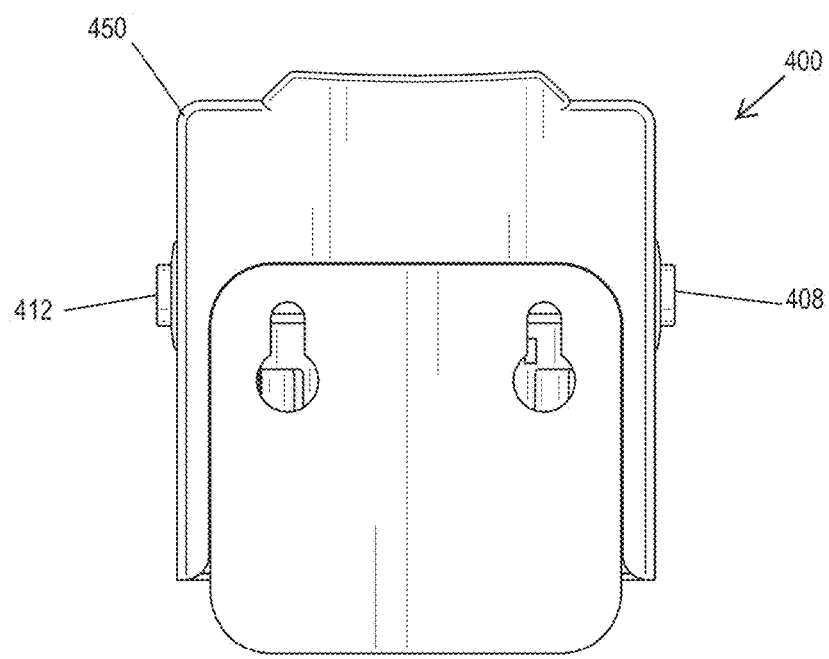
Figure 15:
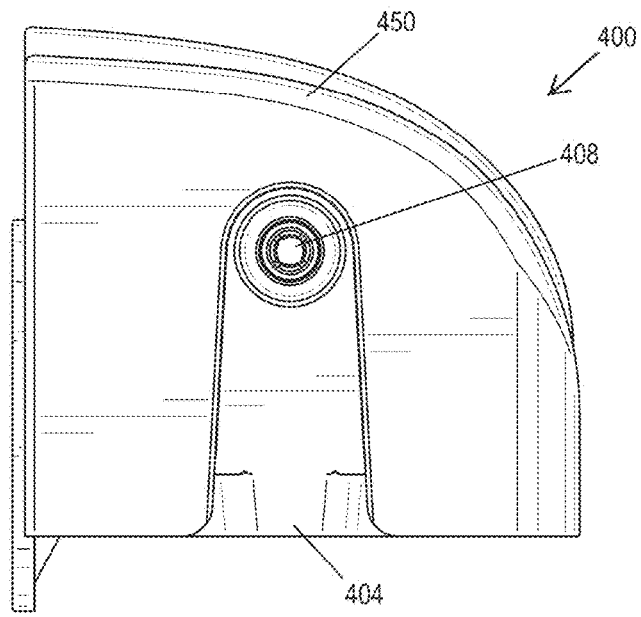
Figure 16:
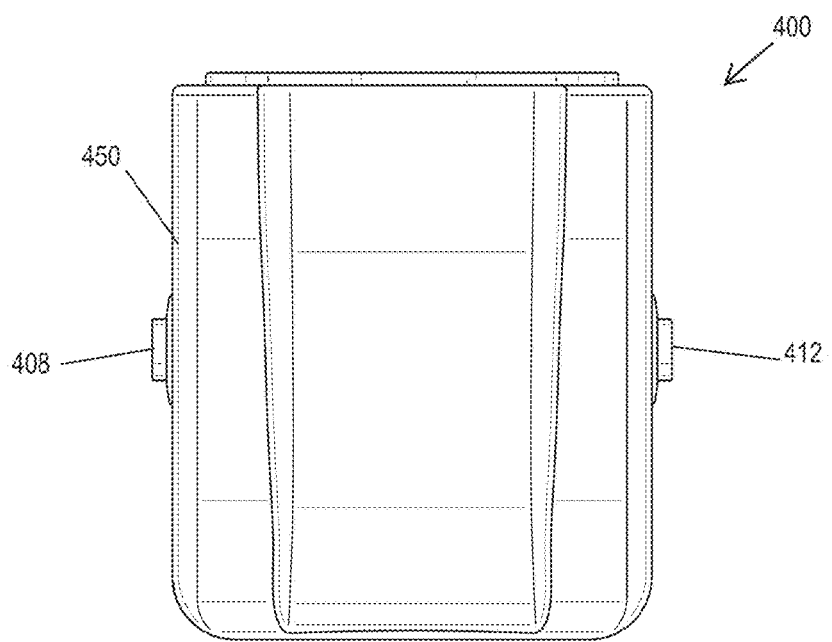
Figure 17A:
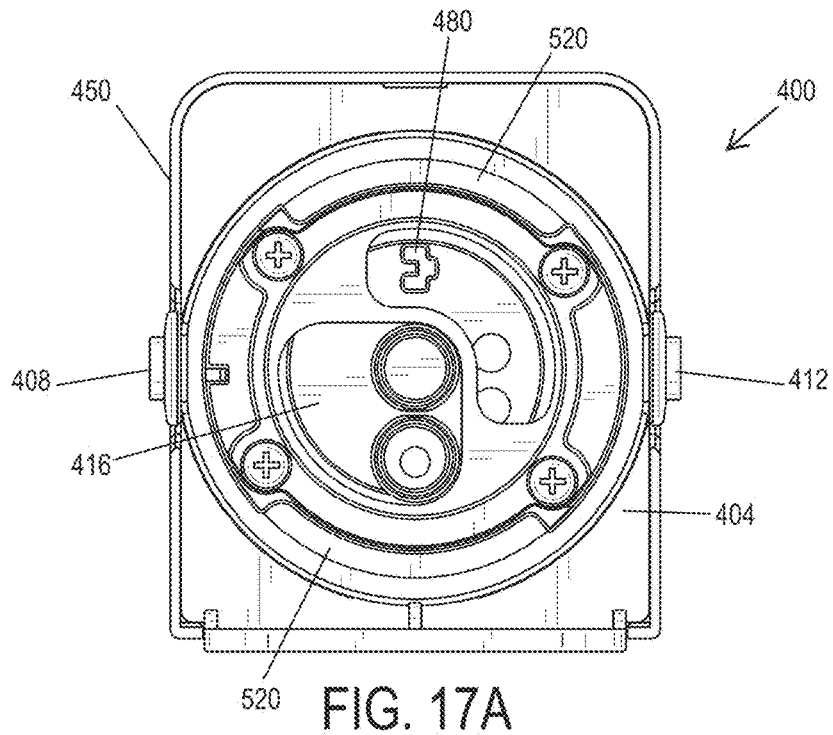
Figure 17B:
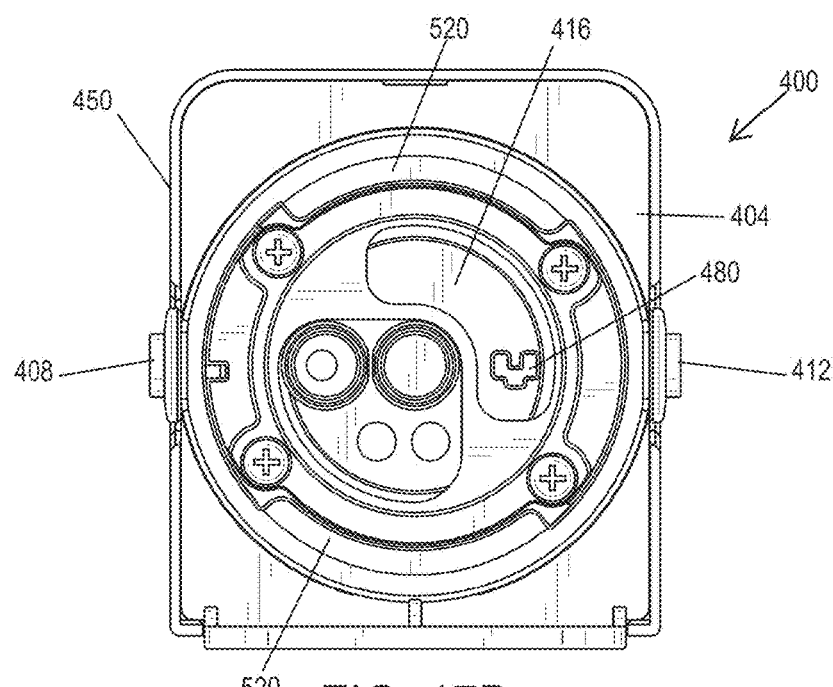
Figure 18:
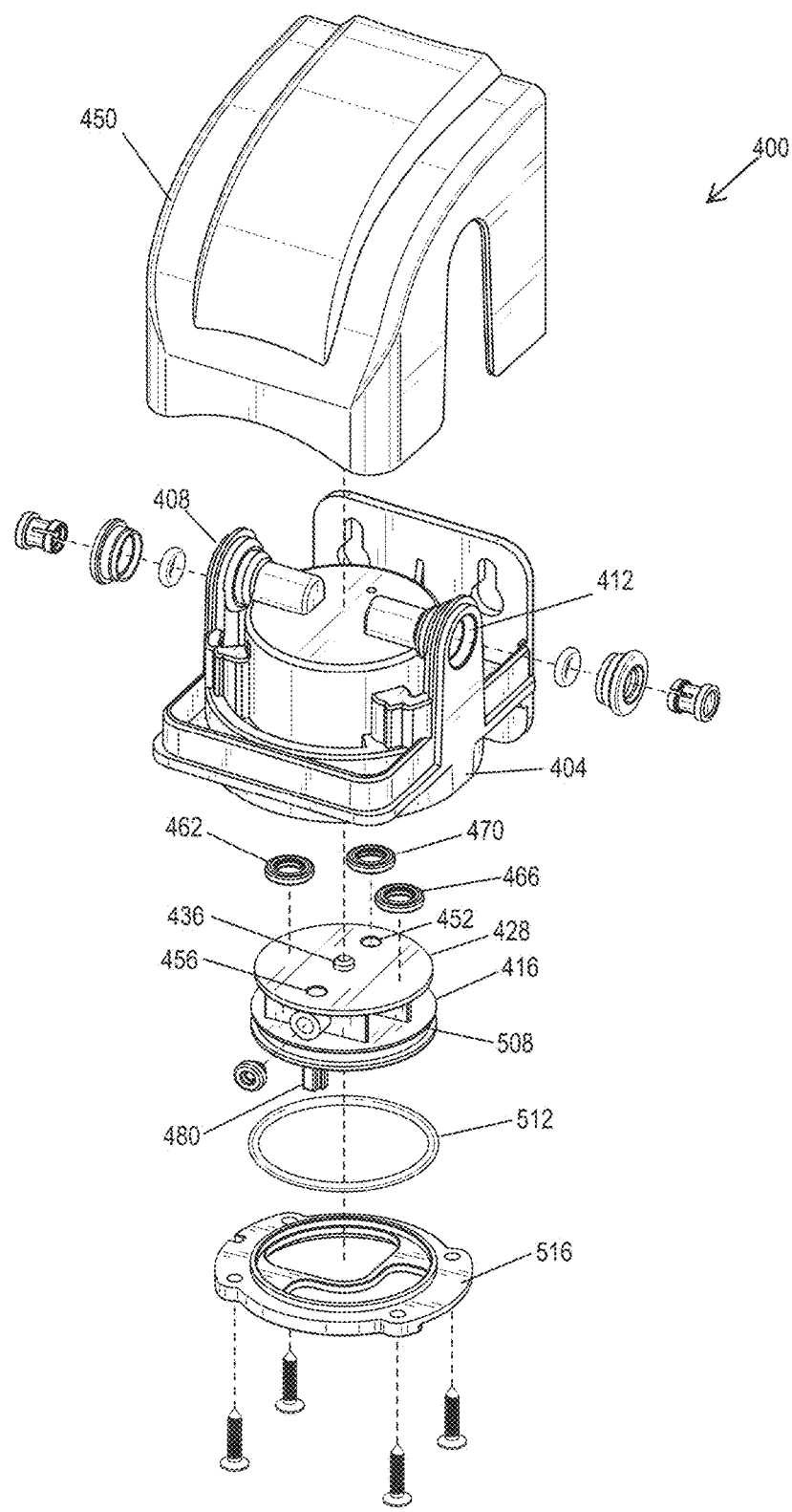
Figure 19A:
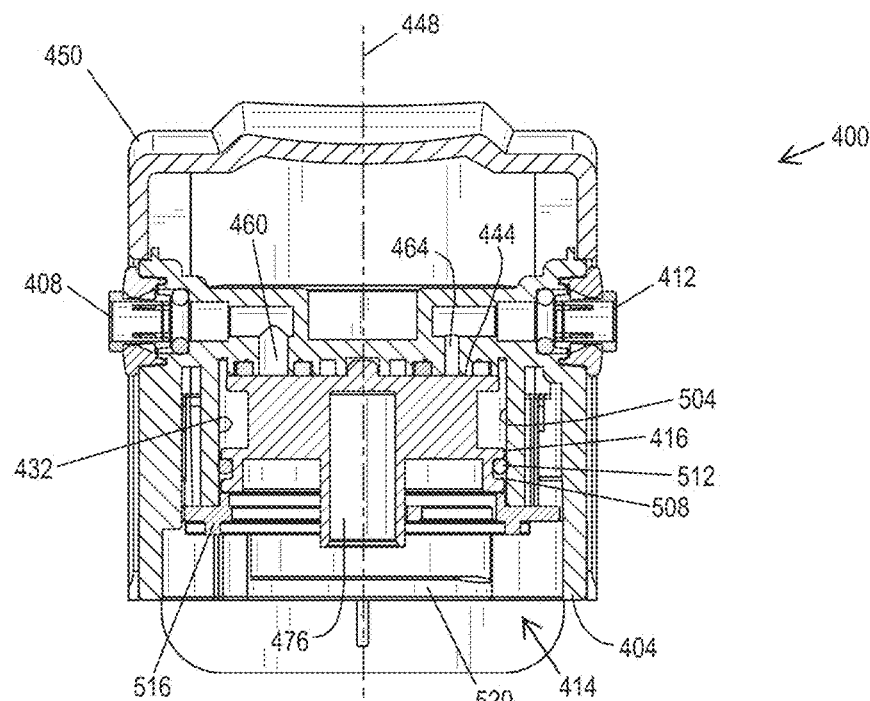
Figure 19B:
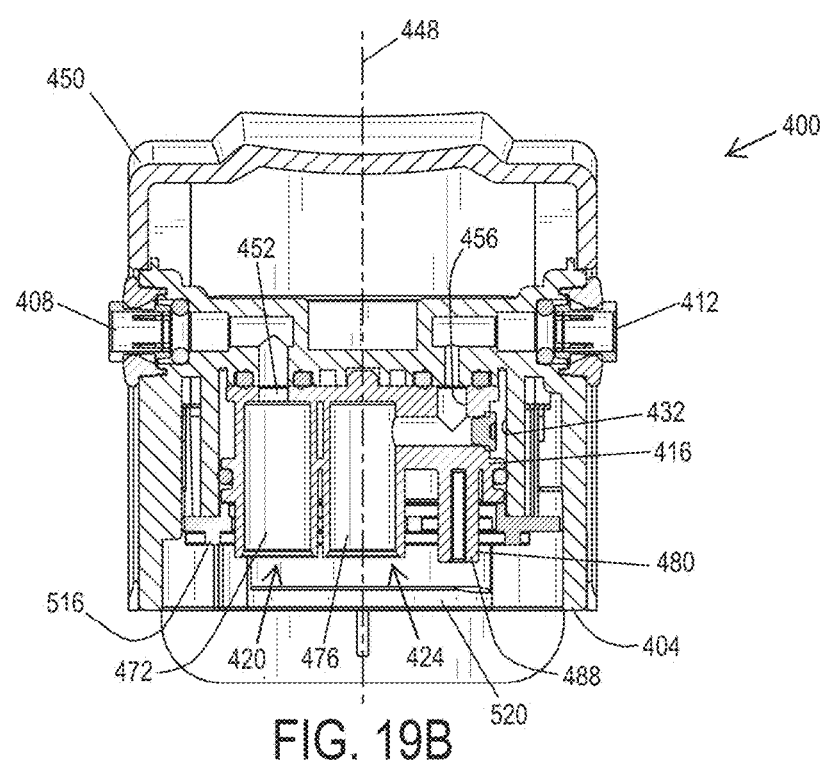
Figure 19C:
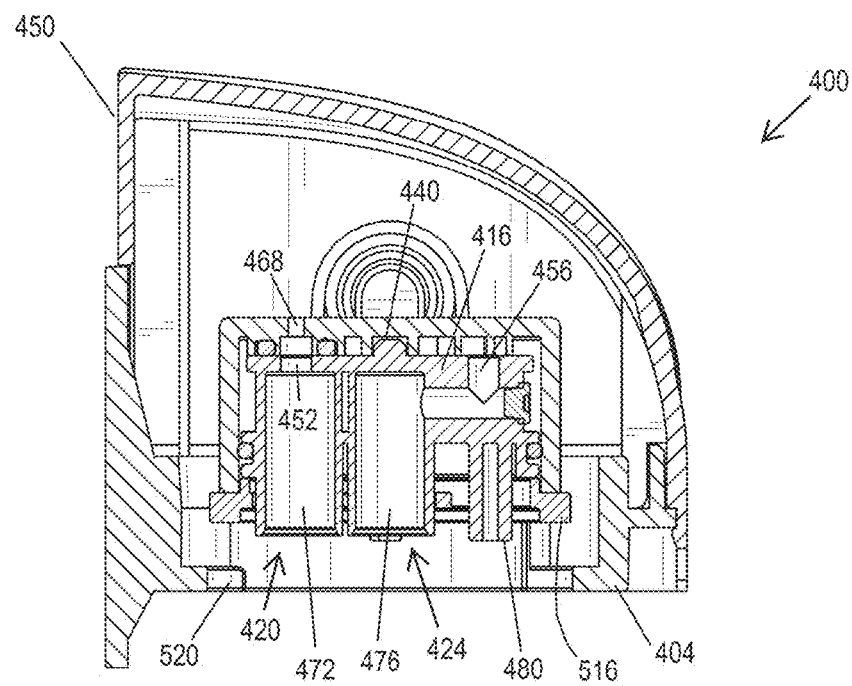
Figure 19D:
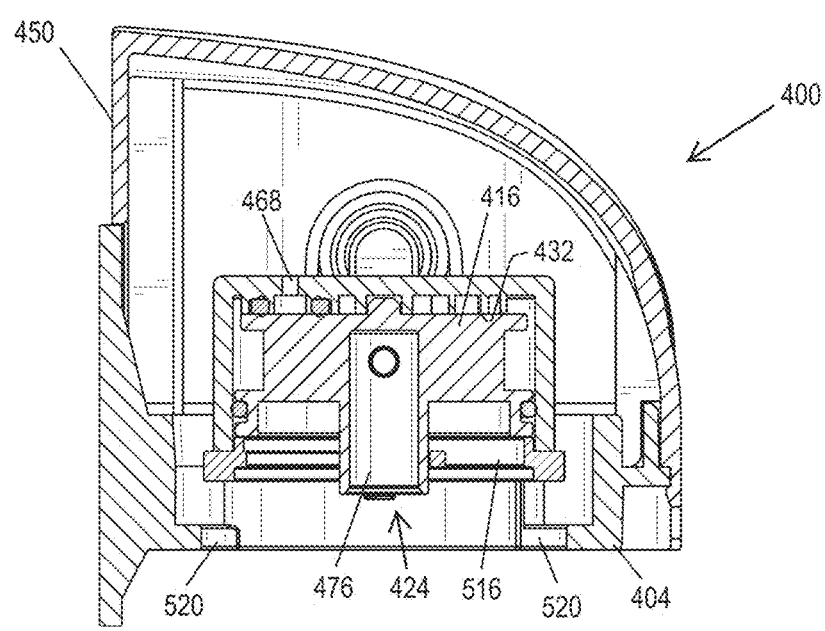
Figure 20A:
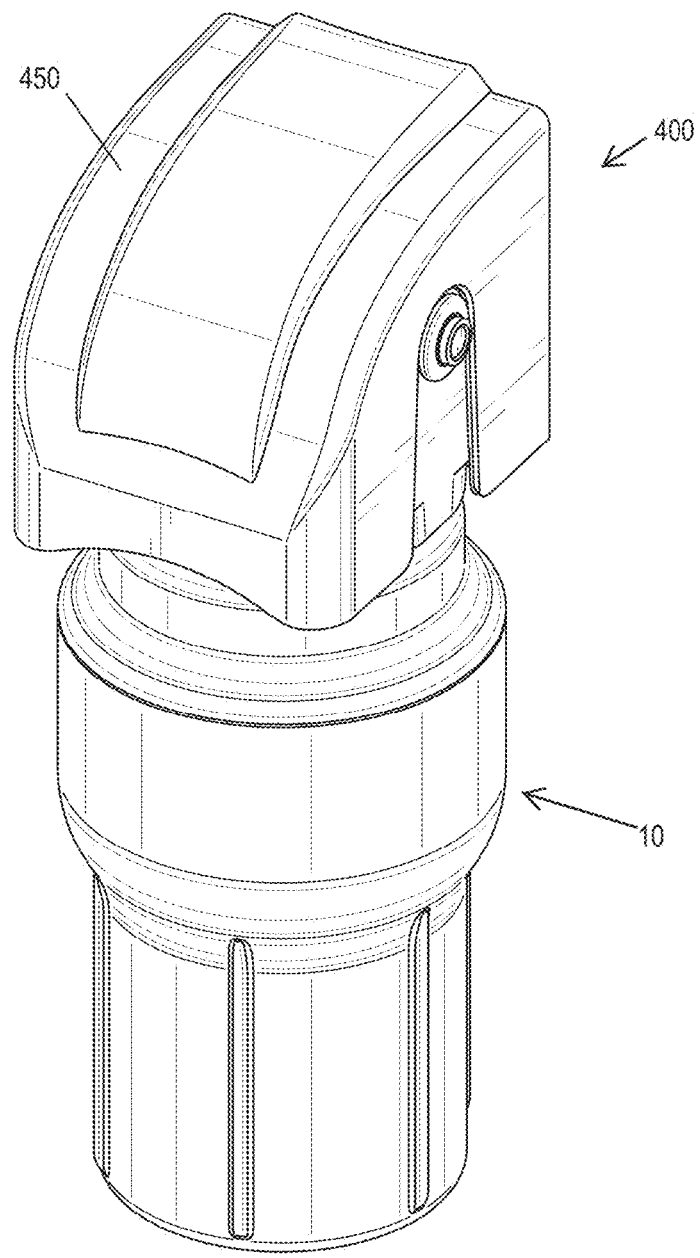
FIGS. 20A-20B are various views of a first embodiment of the present filtration systems including a manifold assembly of FIGS. 12-19D and one filter module of FIGS. 1-7.
Figure 20B:
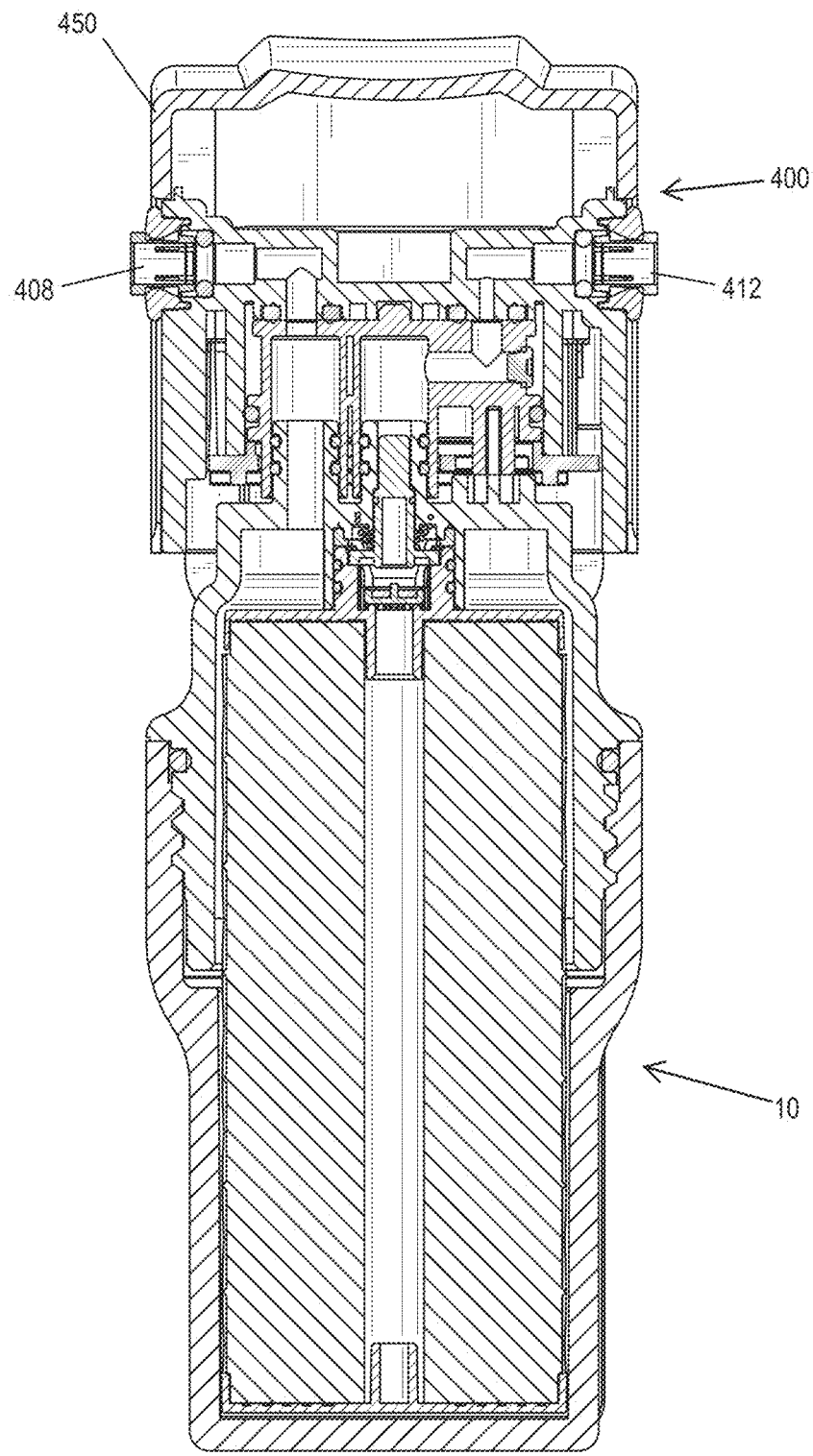

Referring now to FIGS. 12-20B, shown therein and designated by the reference numeral 400 is a first embodiment of the present manifold assemblies for use with filter module 10 in some embodiments of the present filtration systems 500. FIG. 12 depicts a perspective view of manifold assembly 400; FIGS. 13 and 14 depict front and back views, respectively, of manifold assembly 400; FIG. 15 depicts a left side view of manifold assembly 400; FIG. 16 depicts a top view of manifold assembly 400; FIGS. 17A and 17B depict bottom views of manifold assembly 400 with valves in closed and open configurations, respectively; FIG. 18 depicts an exploded perspective view of manifold assembly 400; FIGS. 19A and 19B depict front cross-sectional views of manifold assembly 400 with valves in closed and open configurations, respectively; FIGS. 19C and 19D depict side cross-sectional views of manifold assembly 400 with valves in closed and open configurations, respectively. FIGS. 20A and 20B depict perspective and front cross-sectional views, respectively, of a filtration system 500 including manifold assembly 400 and one filter module 10.

In the embodiment shown, manifold assembly 400 comprises: a manifold body 404 having a manifold inlet 408, a manifold outlet 412, and a first filter connection portion 414 that is configured to engage first filter housing 14 to couple filter module 10 to the manifold assembly (e.g., to manifold body 404). In this embodiment, manifold assembly 400 also comprises a valve member 416 movably coupled to the manifold body. As shown, first valve member 416 includes a valve outlet 420 configured to communicate with filter inlet 22 of filter housing 14 (of a first filter module 10), and a valve inlet 424 configured to communicate with filter outlet 26 of filter housing 14 (of first filter module 10). In some embodiments, such as the one shown, first valve member 416 is configured to be movable between a closed position (FIGS. 19A and 19C) in which fluid communication is substantially prevented between manifold inlet 408 and valve outlet 420 of the first valve member, and an open position (FIGS. 19B and 19D) in which fluid communication is permitted between manifold inlet 408 and valve outlet 420 of the first valve member. For example, in the embodiment shown, first valve member 416 is rotatably coupled to manifold body 404 such that first valve member 416 is configured to rotate (e.g., by 90 degrees, as shown) between the closed position (FIGS. 19A and 19C) and the open position (FIGS. 19B and 19D).

In the embodiment shown, first valve member 416 has a generally (circular) cylindrical shape and includes an manifold mating surface 428 configured to face a first valve mating surface 432 of manifold body 404. As shown, manifold mating surface 428 includes a central projection 436 configured to extend into a central recess 440 in upper portion 444 of valve mating surface 432 to maintain the centered alignment of the first valve member relative to rotational axis 448. In this embodiment, manifold mating surface 428 of the first valve member includes a first opening 452 offset from rotational axis 448, a second opening 456 offset from rotational axis 448 and is positioned 180 degrees around rotational axis 448 relative to first opening 452. Similarly, first valve mating surface 432 of the manifold body includes a first opening 460 corresponding to first opening 452, an O-ring or other (e.g., resilient) seal 462 disposed in a groove in or otherwise coupled to valve mating surface 432 around first opening 460, a second opening 464 corresponding to second opening 456, and an O-ring or other (e.g., resilient) seal 466 disposed in a groove in or otherwise coupled to valve mating surface 432 around second opening 464, such that: (1) when valve member 416 is in the open position (FIGS. 19A and 19C), first opening 452 is aligned with first opening 460 and second opening 456 is aligned with second opening 464; and (2) when valve member 416 is not in the closed position (FIGS. 19B and 19D), first opening 452 is not aligned with (is positioned 90 degrees around rotational axis 448 relative to) first opening 460, and second opening 456 is not aligned with (is positioned 90 degrees around rotational axis 448 relative to) second opening 464. In the embodiment shown, first valve mating surface 432 of manifold body 404 further includes a third opening 468 disposed between first opening 460 and second opening 464 such that second opening 456 of manifold mating surface 428 can be aligned with third opening 468 of valve mating surface 432 to permit fluid flow through third opening 466 during insertion of fittings 30 and 34 of first filter housing 14 into valve member 416 (e.g., to prevent air from being trapped air from interfering with such insertion). In the embodiment shown, an O-ring or other (e.g., resilient) seal 470 is disposed in a groove in or otherwise coupled to valve mating surface 432 around third opening 468. In the embodiment shown, first opening 452 of first valve body 416 is offset from and in fluid communication with filter outlet 420 via channel 468, and second opening 456 of first valve body 416 is aligned and in fluid communication with filter inlet 424.

First valve member 416 can be configured to engage filter housing 14 such that rotation of the filter housing will rotate the first valve member. For example, in the embodiment shown, first valve member 416 includes a first recess 472 configured to receive fitting 30 of first filter housing 14, and a second recess 476 configured to receive fitting 34 of first filter housing 14, such that if fittings 30 and 34 extend into recesses 472 and 476, rotation of first filter housing 14 will also rotate first valve member 416. In the embodiment shown, recesses 472 and 476 have substantially circular cross-sectional shapes and have a diameter sized to compress O-rings 42 such that O-rings 42 seal the space between fittings 30 and 34 and the surfaces of first valve member that define recesses 472 and 476. In the embodiment shown, first valve member 416 also includes a filter coupling portion 480 configured to engage a valve coupling portion 484 of filter housing 14, such as, for example, to prevent the use of filter housings that do not include valve coupling portion 484. In the embodiment shown, filter coupling portion 480 of the first valve member includes a projection from first valve member 416 having a lower end 488 that extends below the lower ends of recesses 472 and 476, with lower end 488 having a U-shaped cross-section, as shown. In this embodiment, valve coupling portion 484 includes a recess 492 (e.g., disposed in a projection 496 that is shorter than fittings 30 and 34, as shown) having a U-shaped cross-section corresponding to the cross-sectional shape of end 488 of filter coupling portion 480 such that filter coupling portion 480 can engage valve coupling portion 484 if first filter housing 14 is coupled to manifold body 404.

In the embodiment shown, valve body 404 includes a first cylindrical valve recess 504 configured to receive first valve member 416. In this embodiment, first valve member 416 includes a peripheral groove 508 configured to receive an O-ring 512 to provide a seal between the perimeter of first valve member 416 and manifold body 404 in valve recess 504, as shown. In this embodiment, manifold assembly 404 further includes a first retainer (e.g., plate) 516 configured to be coupled (e.g., via one or more screws) to manifold body 404 to resist removal of first valve member 416 from first valve recess 504. As shown in FIGS. 17A and 17B, retainer 516 includes one or more opening configured to permit fittings 30 and 34 of first filter housing 14 and filter coupling portion 480 of first valve member 416 to extend through retainer 516, and to permit the first valve member and the first filter housing to rotate relative to retainer 516. In some embodiments, first filter connection portion 414 is configured to resist removal of first filter housing 14 when first valve member 416 is in the open position (FIGS. 19A and 20B). For example, in the embodiment shown, first filter connection portion 414 includes a plurality of (e.g., two, as shown) peripheral flanges 520 extending inward from and around a portion of an interior circumference of manifold body 404. In this embodiment, second housing member 54 of first filter housing 14 includes a plurality of (e.g., two, as shown) flanges 524 extending outward from and around a portion of an exterior circumference of second housing member 54. As shown, flanges 524 are configured to be disposed between (and therefore fit past flanges 520 when valve member 416 is in the closed position (FIG. 19A) to permit filter module 10 to be separated from manifold housing 400. Likewise, if first valve member 416 is in the open position (FIG. 19A) and first filter housing 14 is pressed inward to engage first filter member 416, first filter housing 14 can be rotated 90 degrees in a clockwise direction to cause flanges 524 to overlap flanges 520 and thereby resist removal of filter module 10 from manifold assembly 400.

Thus, in the embodiment shown, first valve member 416 (recesses 472 and 476, and lower end 488) is configured to engage first filter housing 14 (via fittings 30 and 34, and recess 492 of valve coupling portion 484) such that rotation of the first filter housing by ninety degrees or less relative to the manifold body (from the closed position of first valve member 416 shown in FIG. 19A to the open position of first valve member 416 shown in FIG. 19B) to simultaneously couple the first filter housing to the manifold assembly and rotate first valve member 416 to the open position (FIG. 19B). With filter module 10 coupled to manifold assembly 400 and first valve member 54 in the open position of FIG. 19B, water (or other liquid) entering manifold inlet 408 is directed through openings 460 and 452, and out of the manifold assembly via valve outlet 420. As it exits the manifold assembly, the water (or other liquid) is directed into filter module 10 via filter inlet 22, into the annular space between the exterior of filter 206 and the interior of first filter housing 14, and is forced inward through filter 206. The water (or other liquid) then flows into passage 208, through valve 78 (through xx 156 of plunger 146), and exits filter module 10 via filter outlet 26. As it exits the filter module, the water (or other liquid) is directed back into manifold assembly 400 via valve inlet 424, through openings 456 and 464, and out via manifold outlet 412.

In the embodiment shown, valve body 404 includes a flange 528 with a plurality of elongated openings 532 each having a circular portion 536 and an elongated portion 540. In this embodiment, each opening 532 is configured such that a screw or nail head can pass through circular portion 536 but not through elongated portion 540. As such, screws or nails can be driven into a (e.g., vertical) surface on which a user desired to hang assembly 400 in positions corresponding to circular portions 536, and valve body 404 can be positioned with the heads of the screws or nails passing through circular portions 536, and valve body 404 can then be moved downward so the shafts of the nails or screws are extending through elongated portions 540 of openings 532 to resist movement of valve body 404 away from the surface. In the embodiment shown, assembly 400 further includes a shroud 550 configured to be disposed over at least a portion of valve body 404, as shown. For example, in this embodiment, shroud 450 extends over substantially all of the top and front, and over portions of the back and left and right sides, of valve body 404, but does not extend over or cover the bottom of valve body 404.

Figure 21:
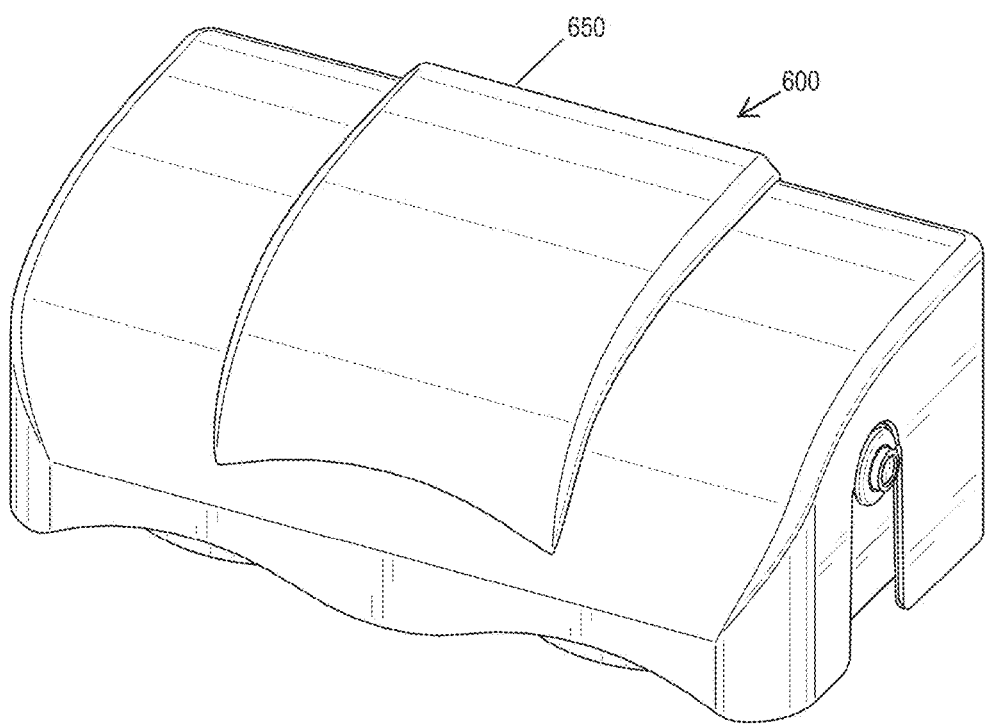
FIGS. 21 and 22-28D are various views of a second embodiment of the present manifold assemblies for use with two of the filter module of FIGS. 1-7 in some embodiments of the present filtration systems.
Figure 21A:
FIG. 21A depicts an alternate version of the manifold assembly of FIG. 21.
Figure 22:
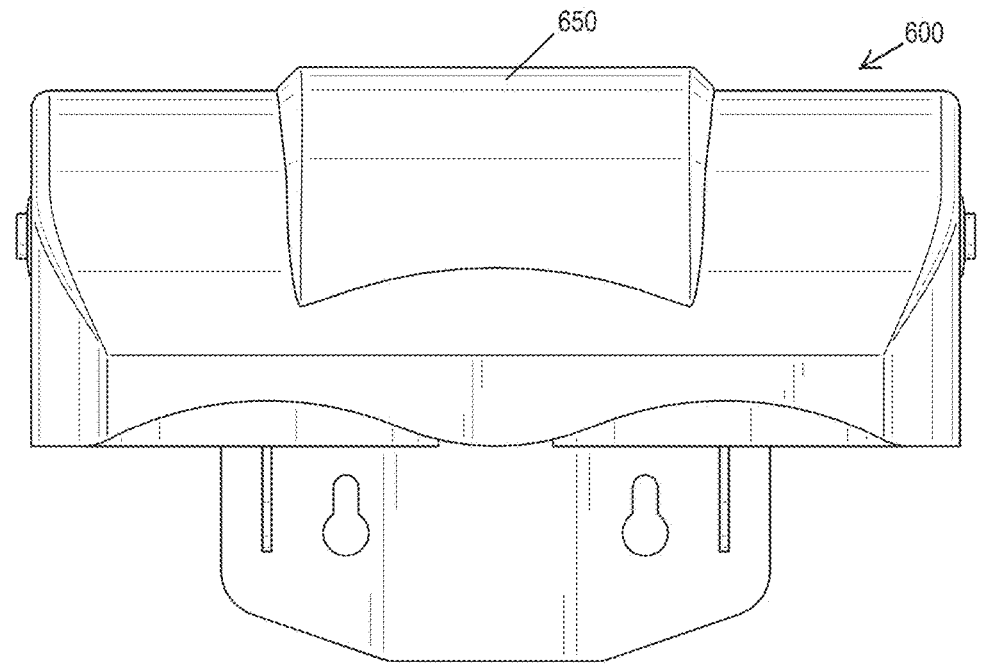
Figure 23:
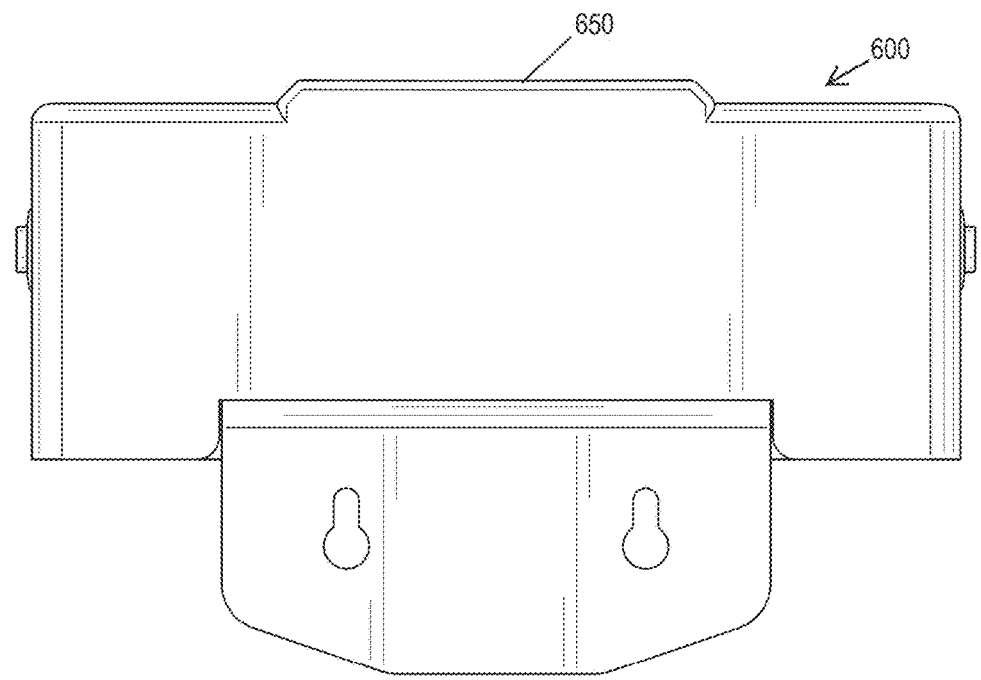
Figure 24:
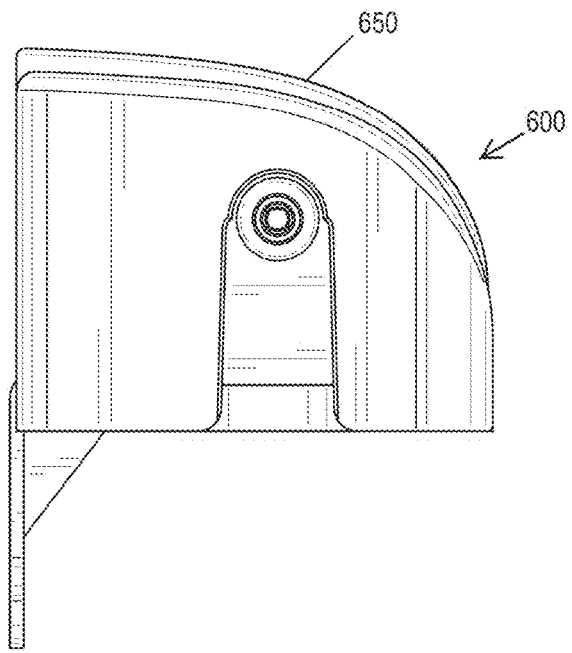
Figure 25:
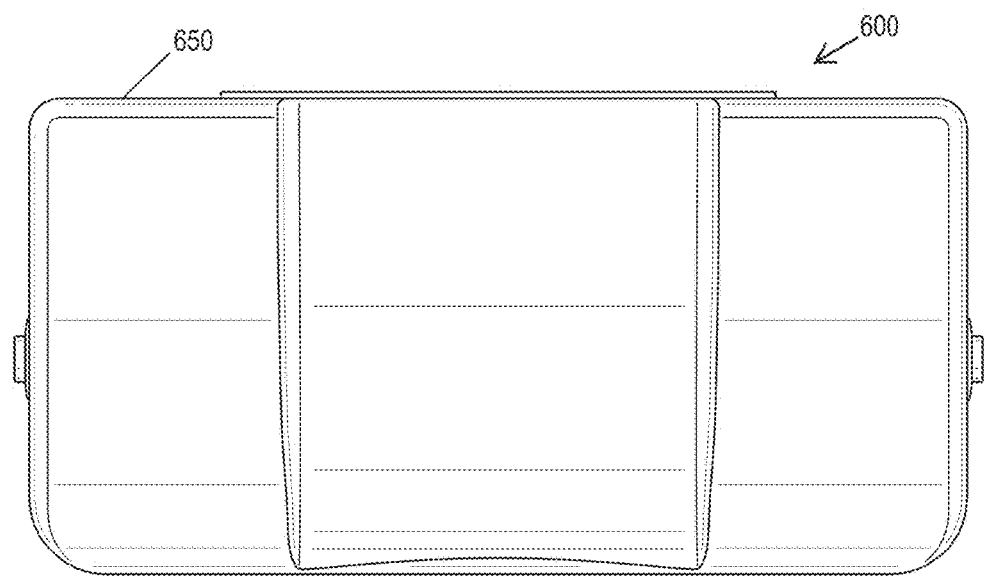
Figure 26A:
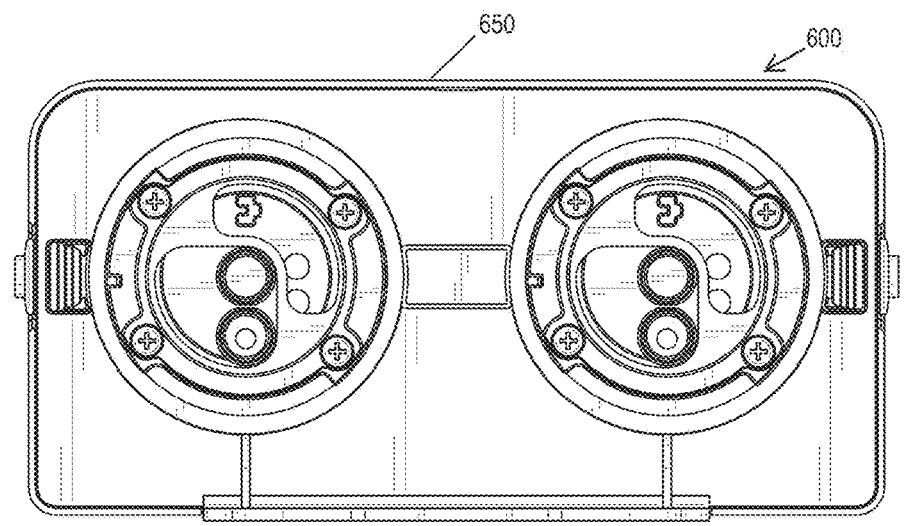
Figure 26B:
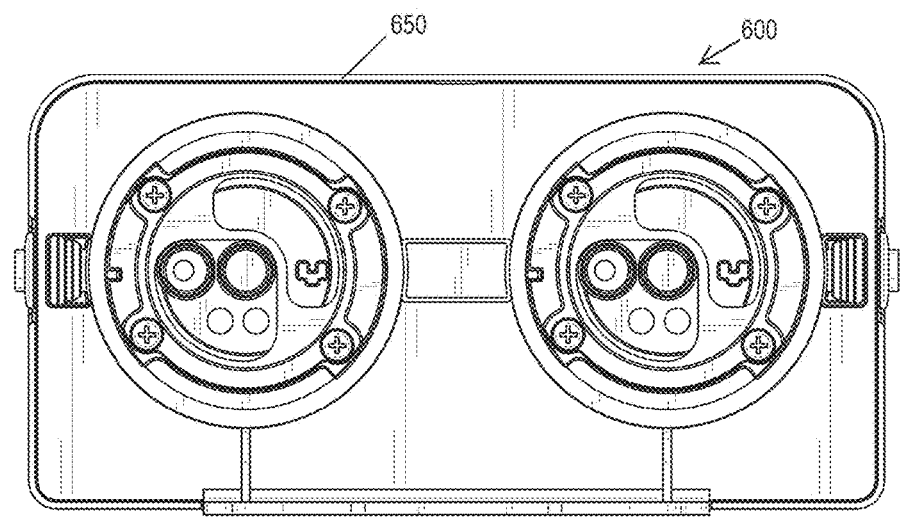
Figure 27:
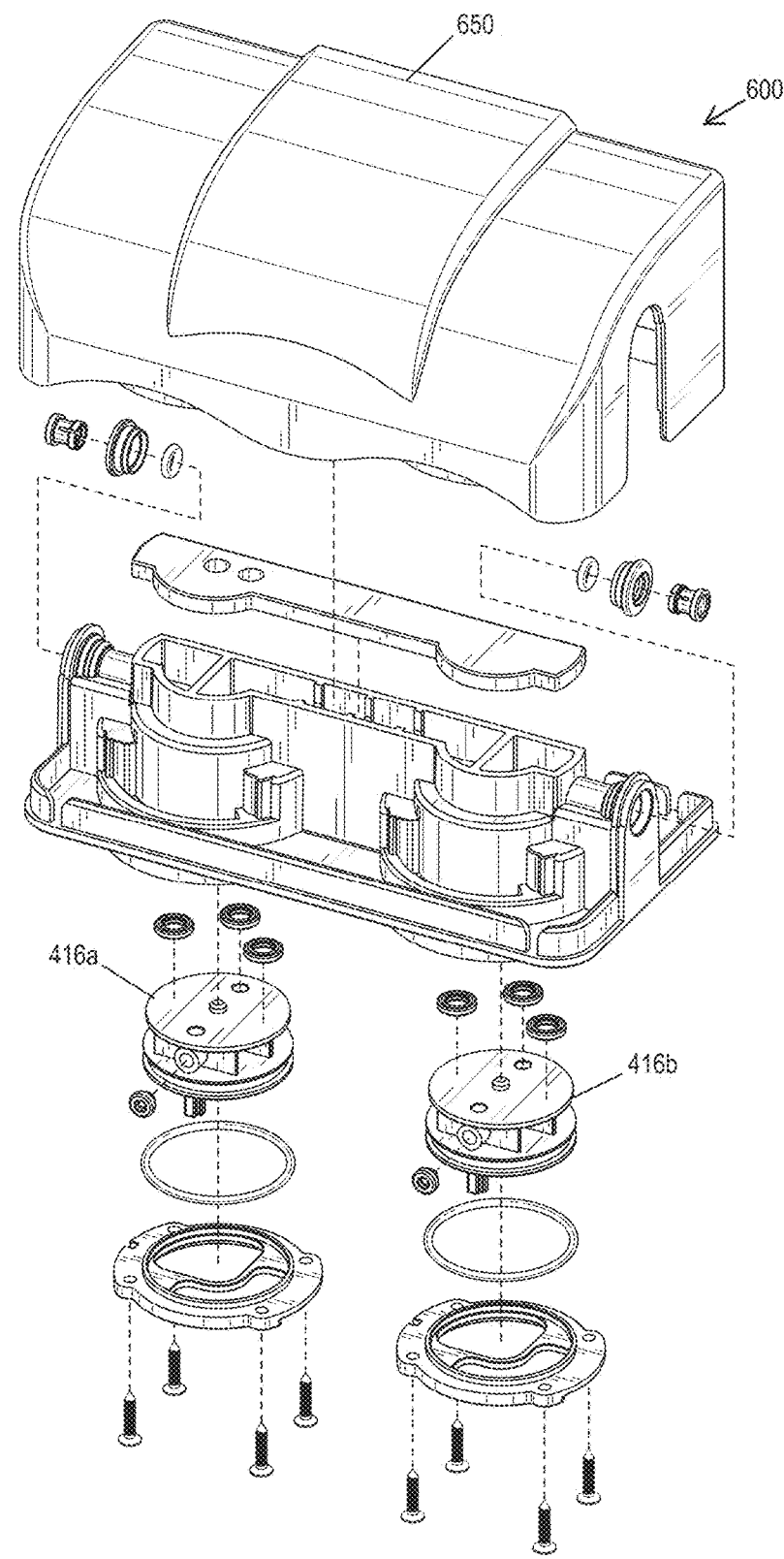
Figure 28A:
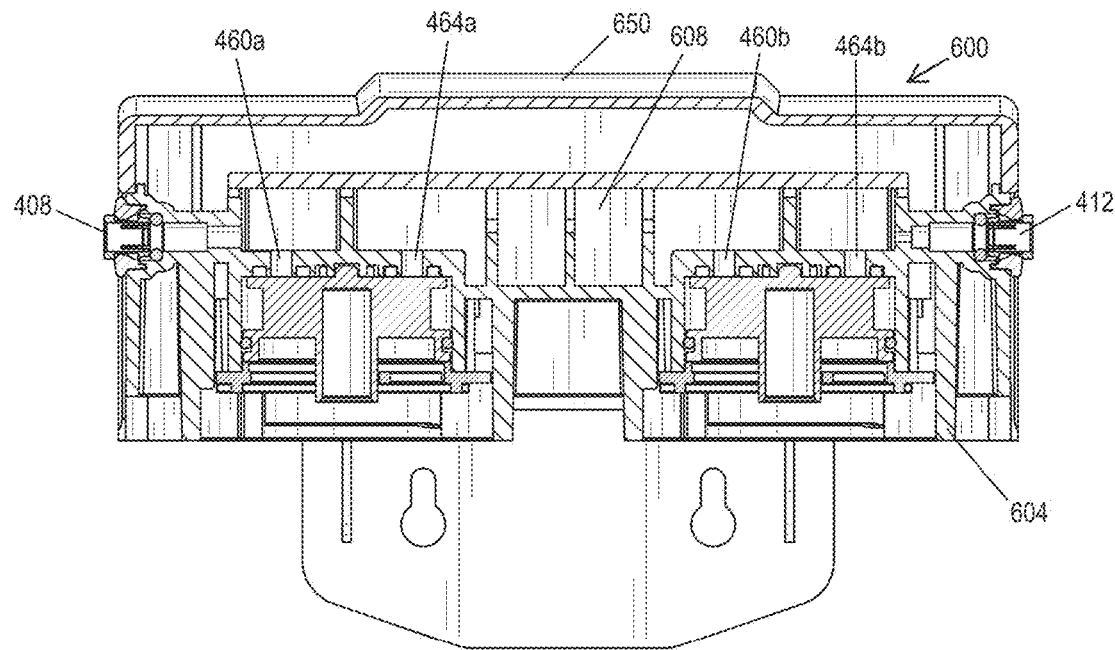
Figure 28B:
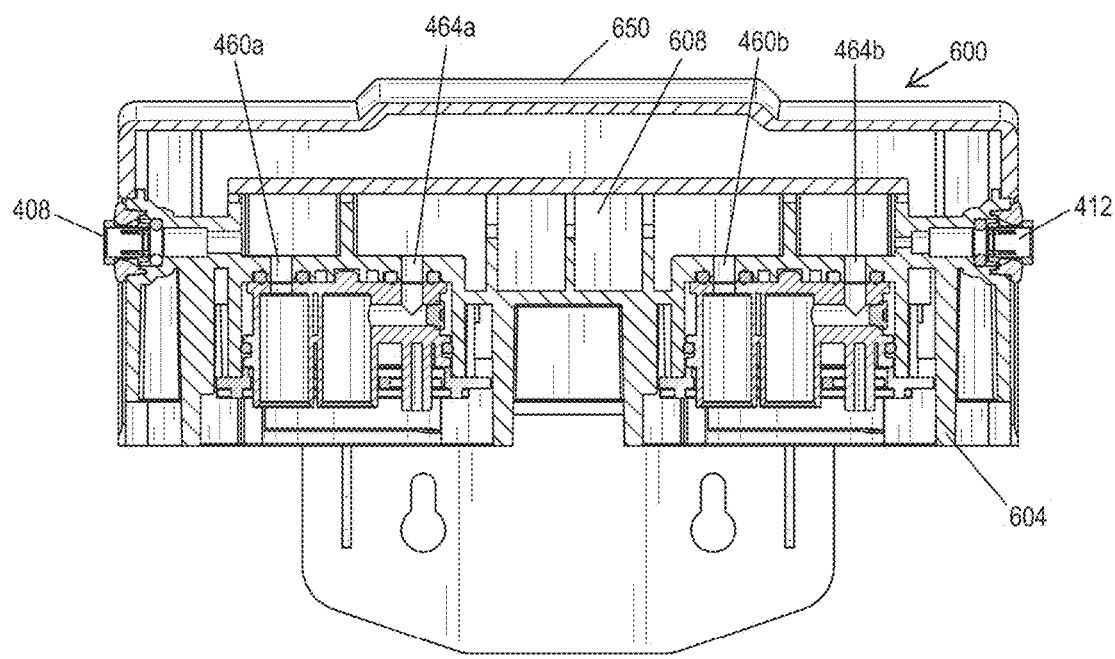
Figure 28C:
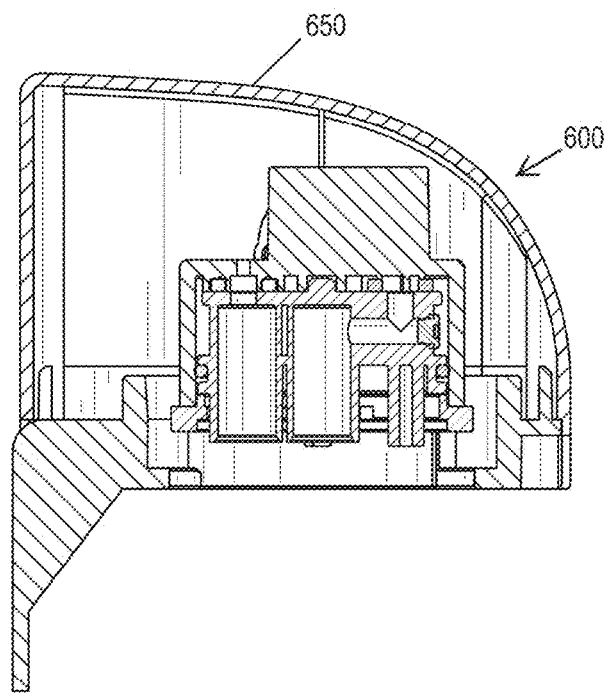
Figure 28D:
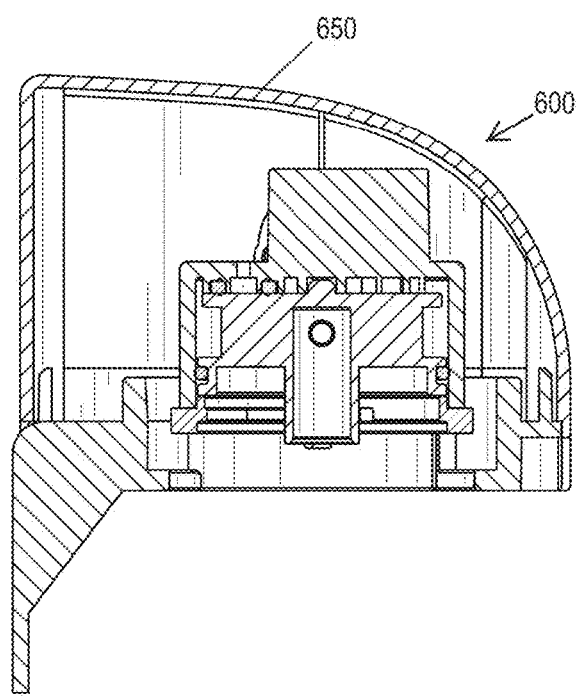
Figure 29A:
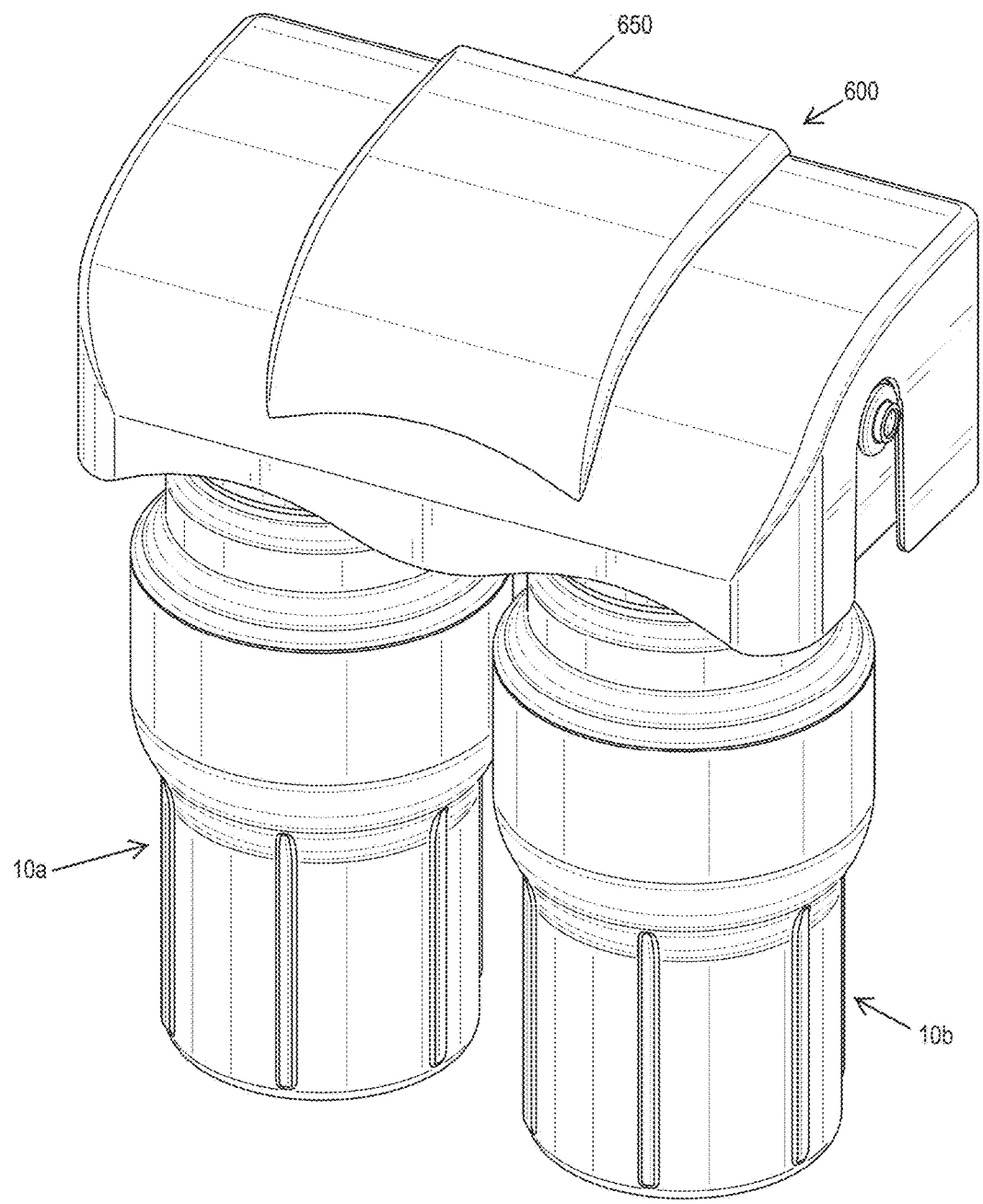
FIGS. 29A-29B are various views of a second embodiment of the present filtration systems including a manifold assembly of FIGS. 21-29B and two filter modules of FIGS. 1-7.
Figure 29B:
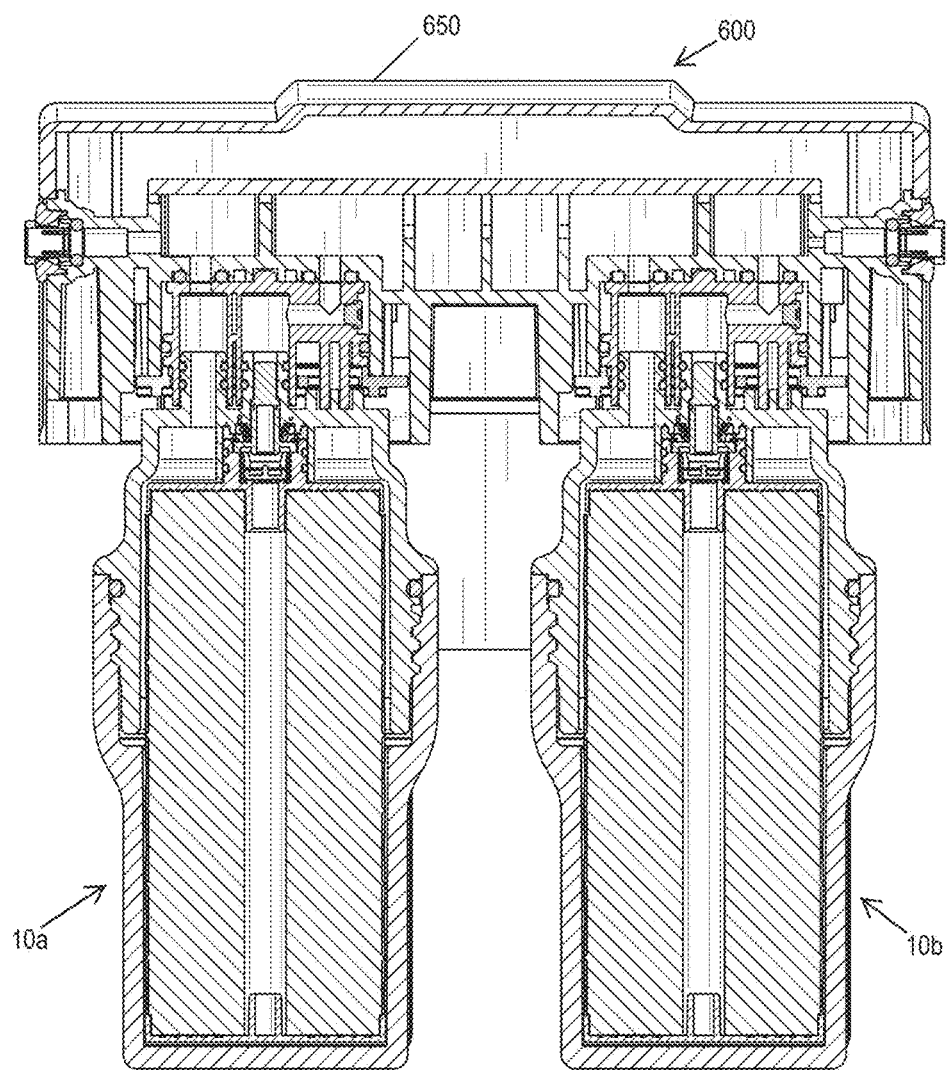
Figure 30A:
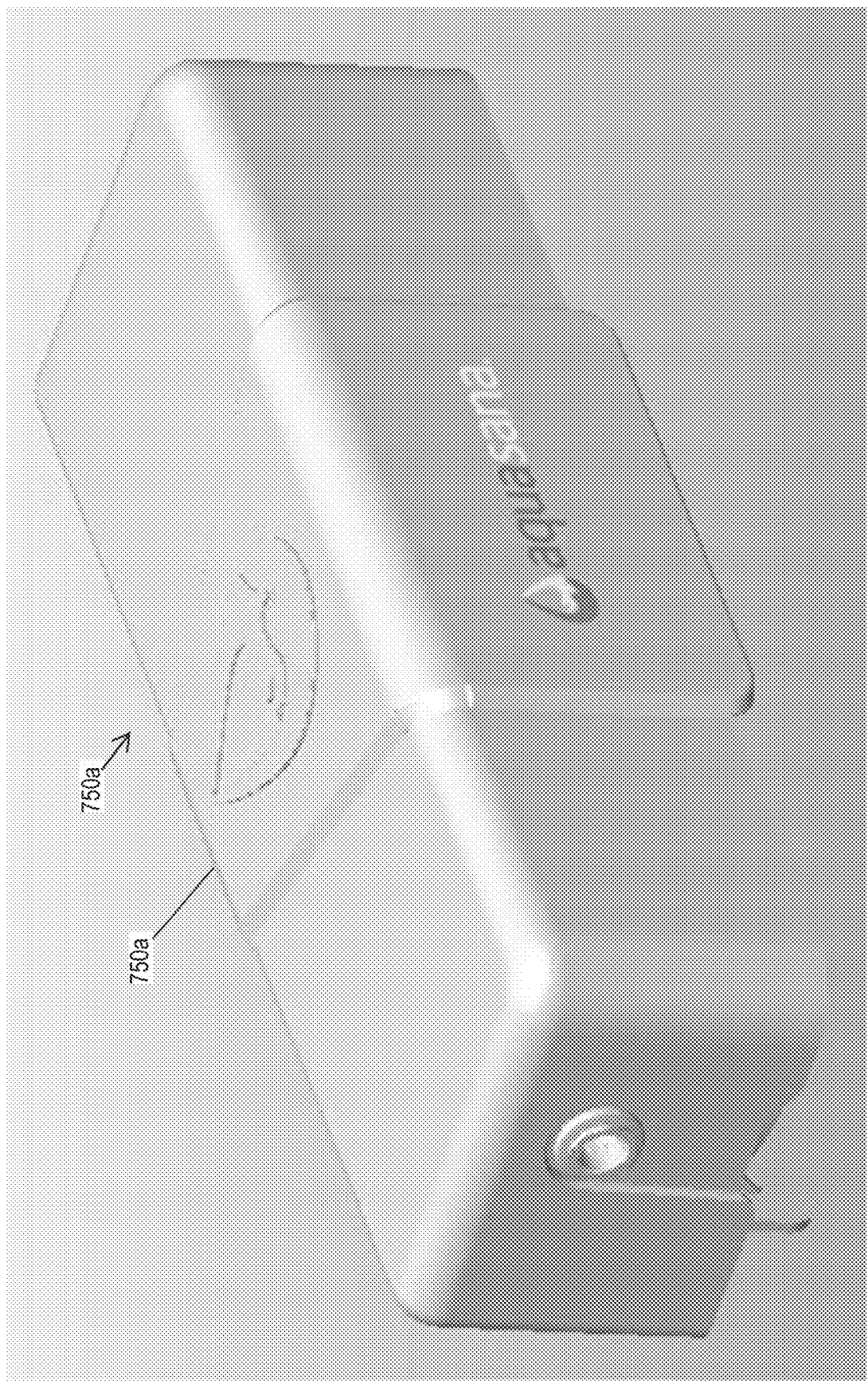
FIG. 30A depicts alternate version of the manifold assembly of FIG. 31.
Figure 31:
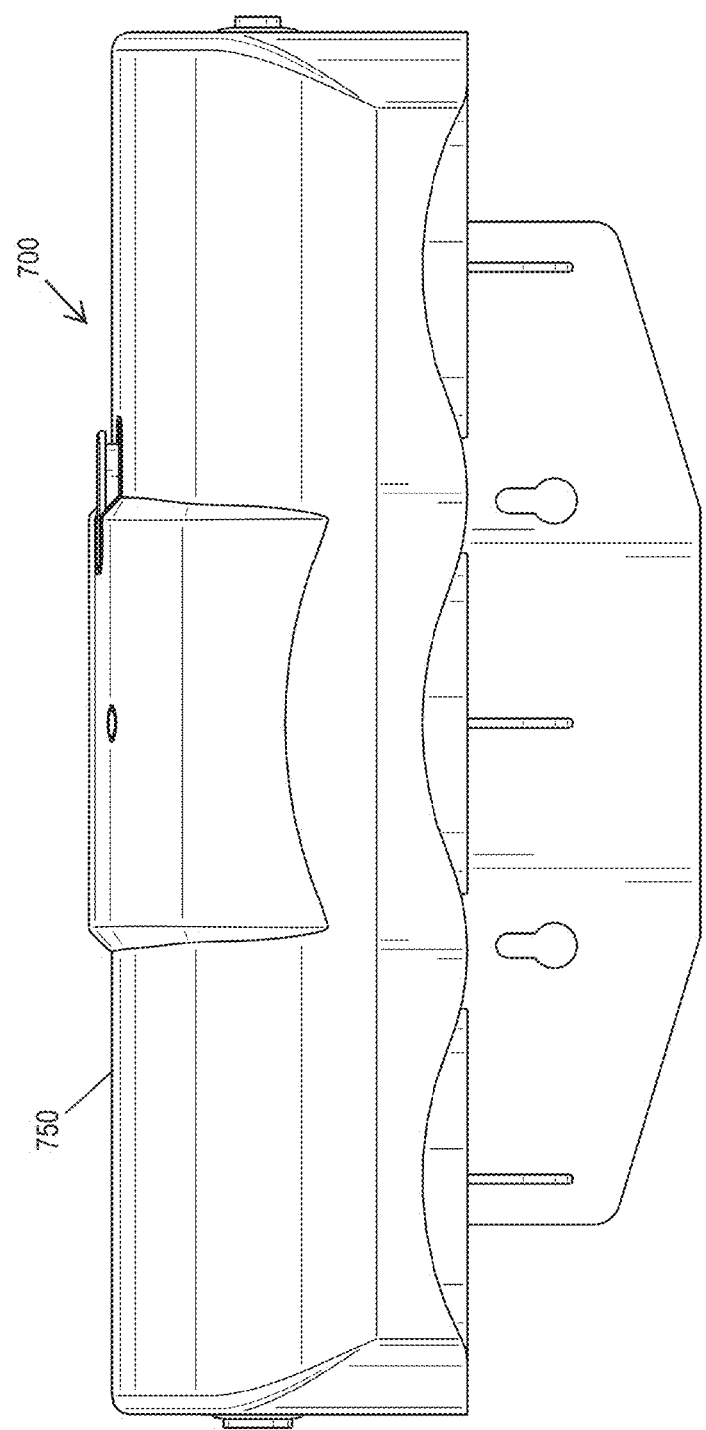
Figure 32:
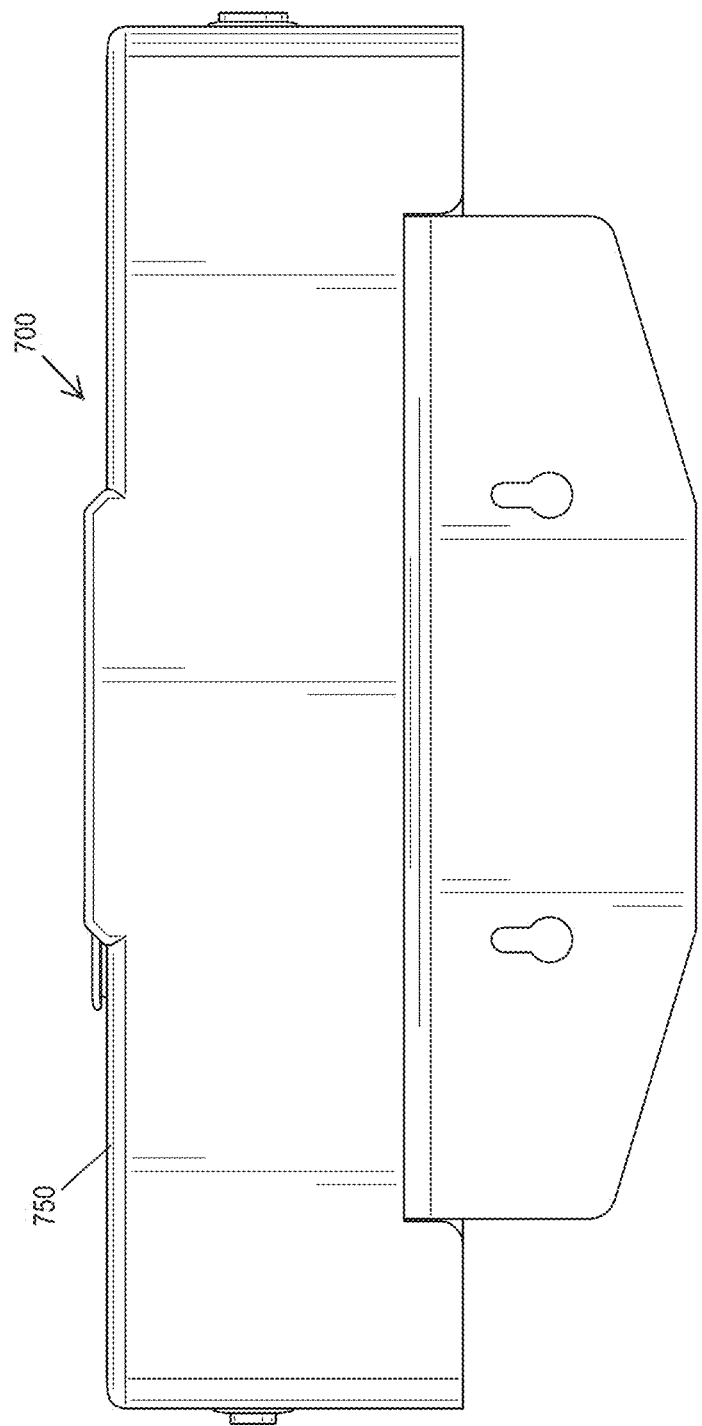
Figure 33:
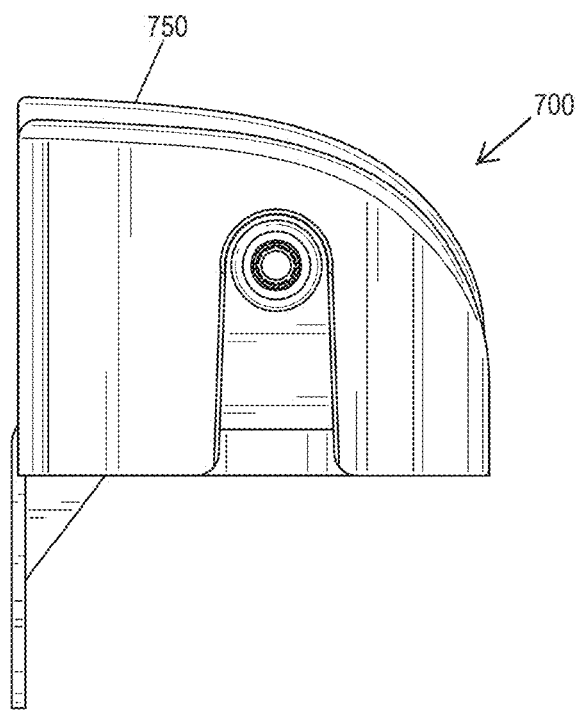
Figure 34:
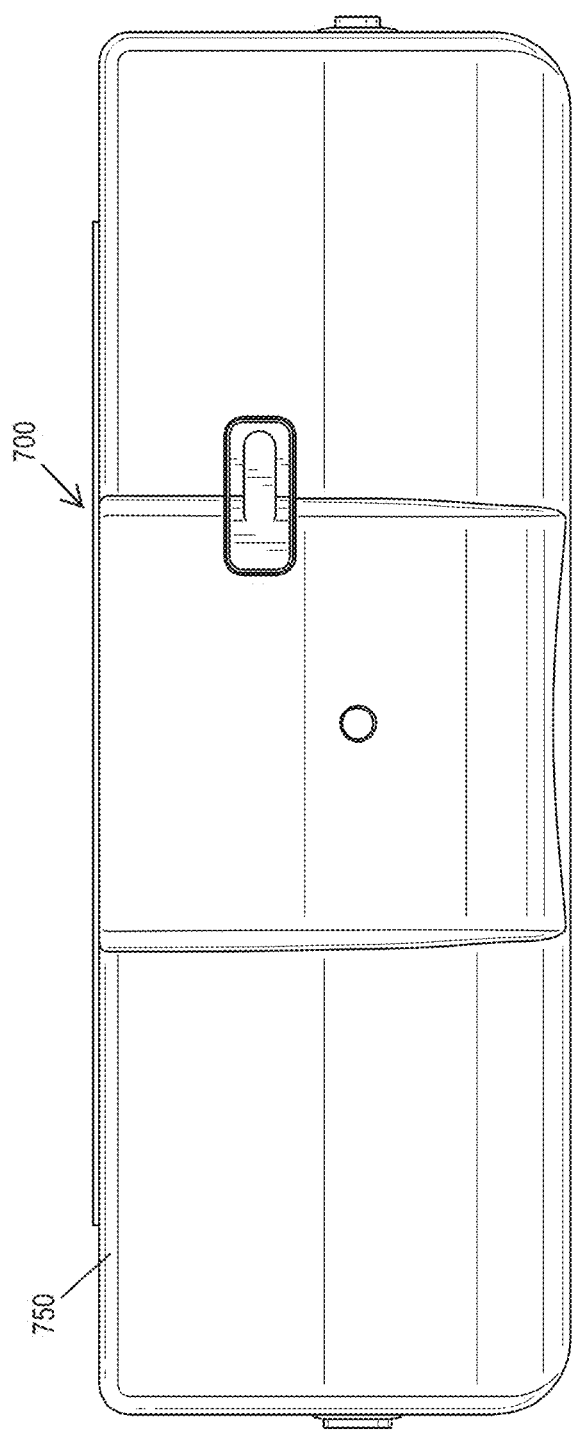
Figure 36:
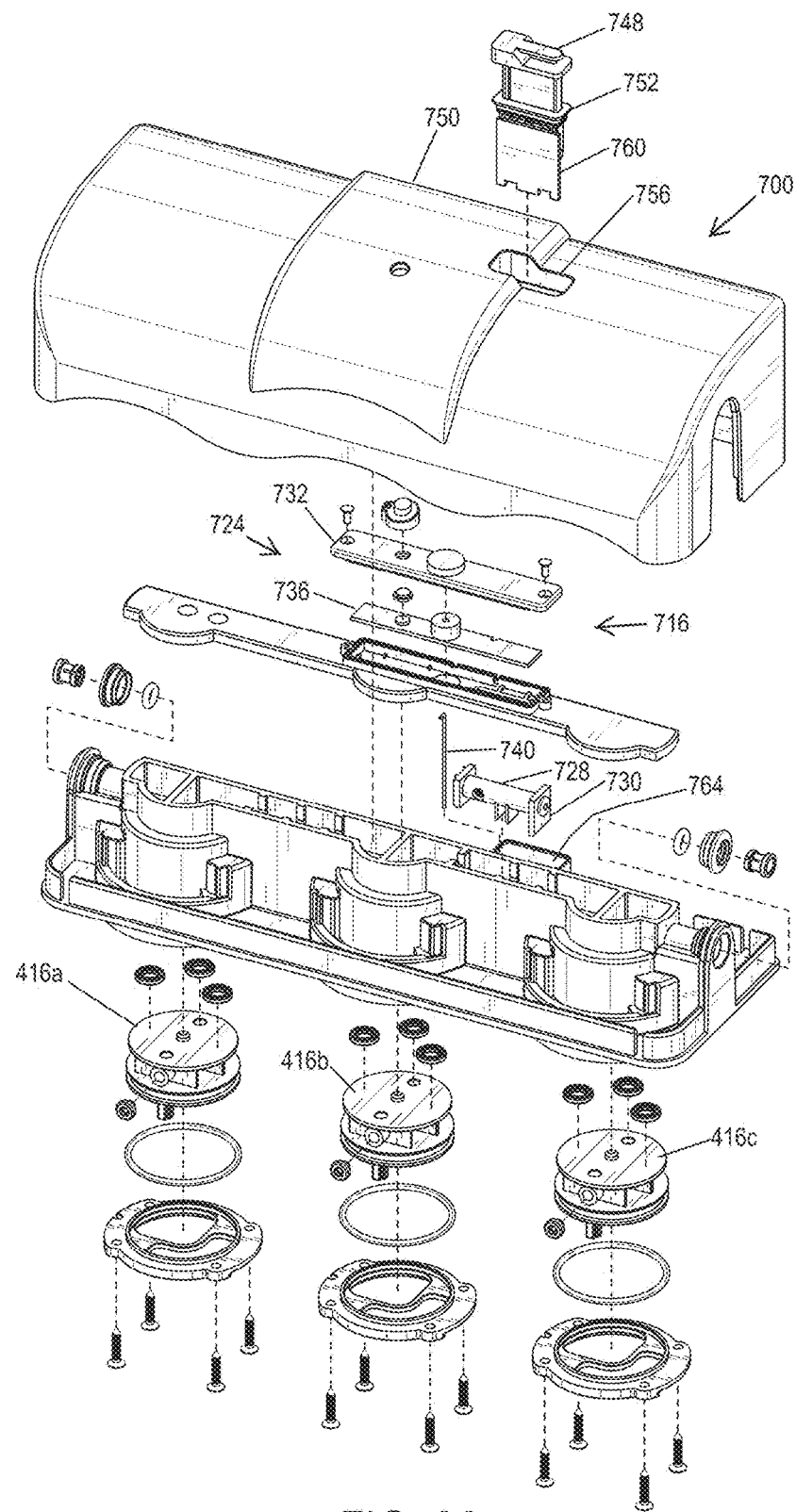
Figure 37A:
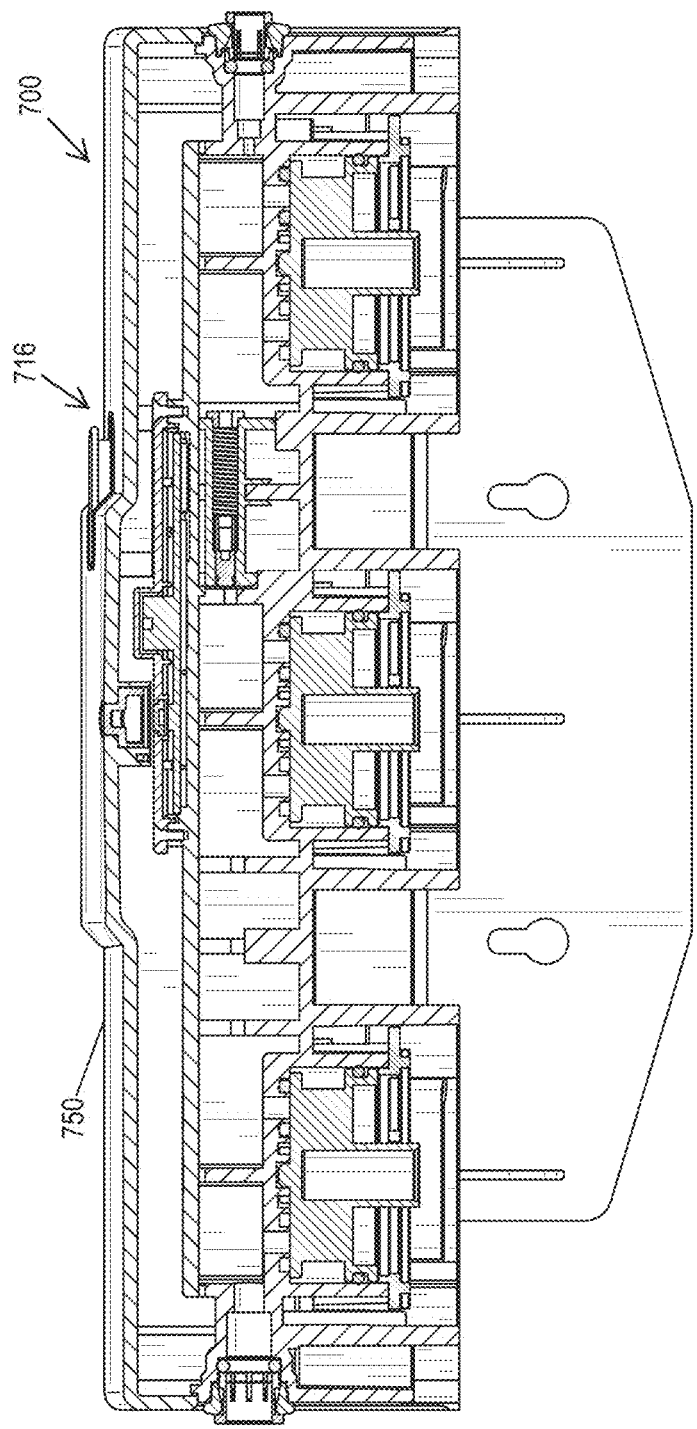
Figure 37B:
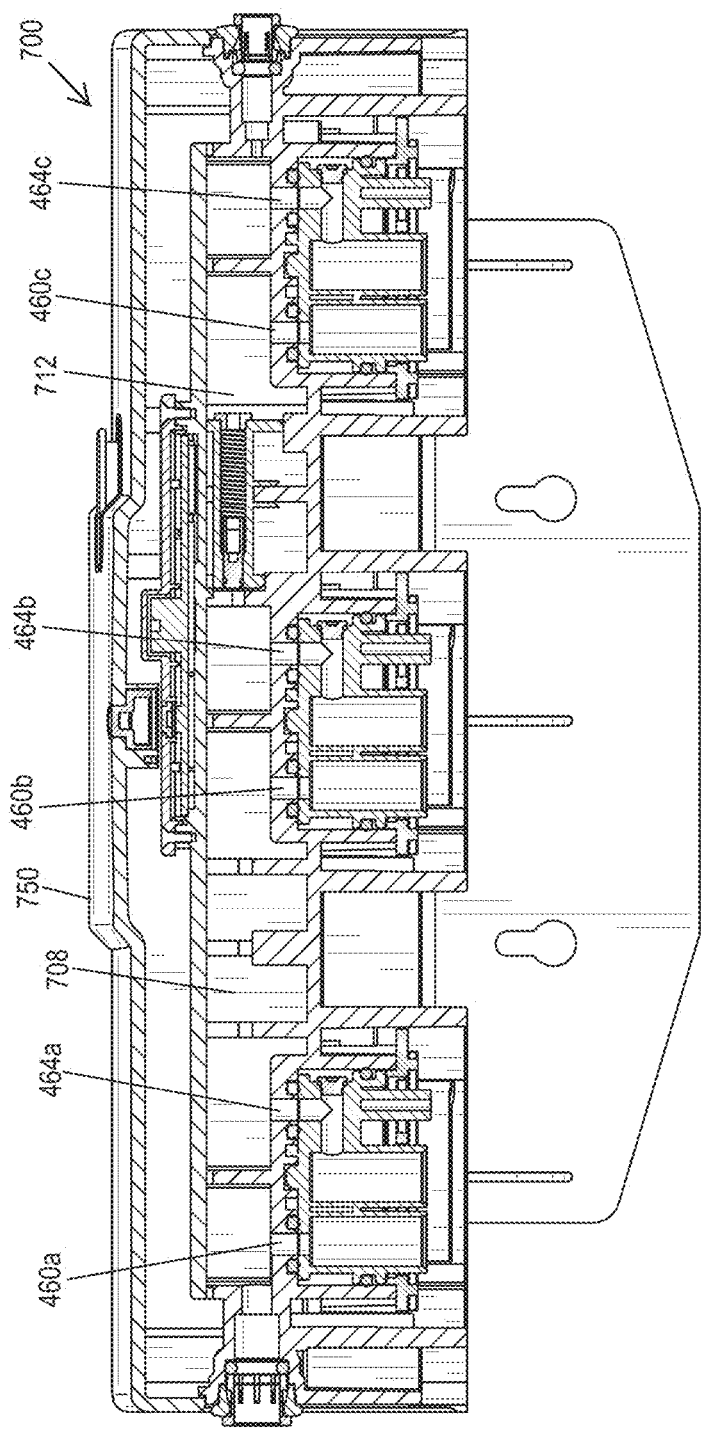
Figure 37C:
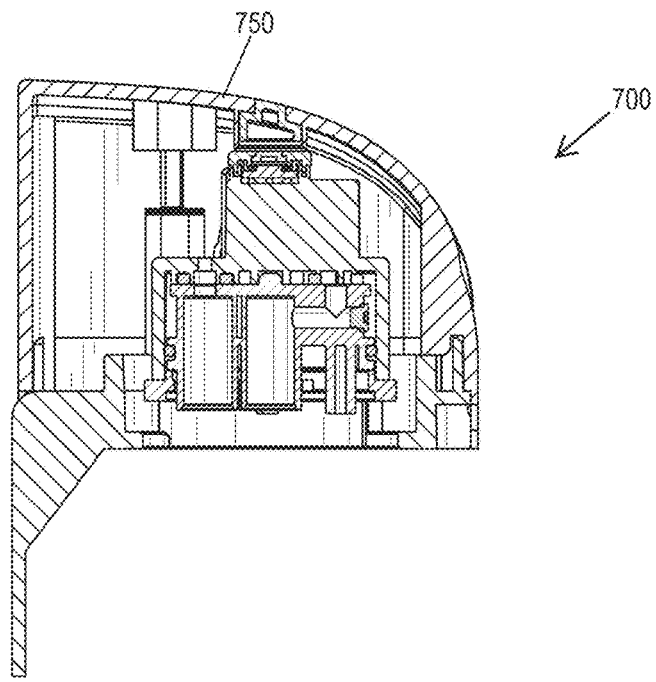
Figure 37D:
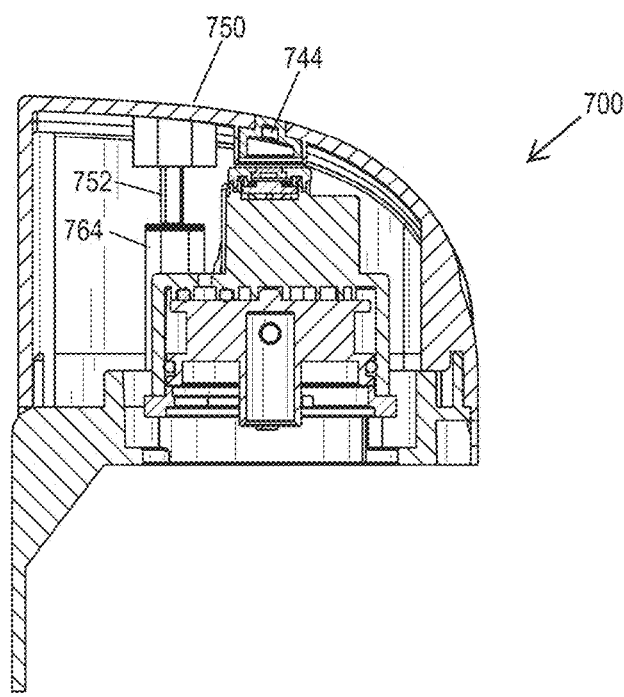

Referring now to FIGS. 21-29B, FIGS. 21-28B are various views of a second embodiment 600 of the present manifold assemblies for use with two filter modules 10a and 10b; and FIGS. 30A-30B are various views of a second embodiment of the present filtration systems 500a that includes a manifold assembly 600 and two filter modules 10a and 10b. FIGS. 26A, 27, 28A, and 28C show valve members 416a and 416b in closed positions relative to valve housing 604 in which liquid is prevented from flowing between inlet 408 and outlet 412; and FIGS. 26B, 28B, 28D, and 29B show valve members 416a and 416b in open positions relative to valve housing 604 in which liquid is permitted to flow between inlet 408 and outlet 412. In the embodiment shown, filter modules 10a and 10b are identical to filter module 10. Manifold assembly 600 is substantially similar in many respects to manifold assembly 400, with the primary difference being that manifold assembly 600 is configured to be coupled to two filter modules 10a and 10b, and manifold body 604 is therefore configured to receive two valve members 416a and 416b (e.g., identical to valve member 416). As such, similar numbers (e.g., 10, 10a, 10b; 416, 416a, 416b, etc.) are used to denote structures that are similar to corresponding structures in manifold assembly 400 and the following description focuses primarily on the features of manifold assembly 600 that differ relative to manifold assembly 400. In the embodiment shown, manifold body 604 includes a hollow chamber 608 extending between opening 464a (from which water or other liquid can flow from the filter outlet of first filter module 10a) and opening 460b (through which water or other liquid can flow into the filter inlet of second filter module 10b) to permit the serial flow of water or other liquid through both of filter modules 10a and 10b. As with assembly 400, assembly 600 comprises a shroud 650 configured to be disposed over at least a portion of valve body 604, as shown. For example, in this embodiment, shroud 650 extends over substantially all of the top and front, and over portions of the back and left and right sides, of valve body 604, but does not extend over or cover the bottom of valve body 604. FIG. 21A depicts an alternate two-stage embodiment 600a that is substantially similar to assembly 600, with the exception that assembly 600a includes a shroud 650a with a shape that differs from that of shroud 650, as shown.

Figure 38A:
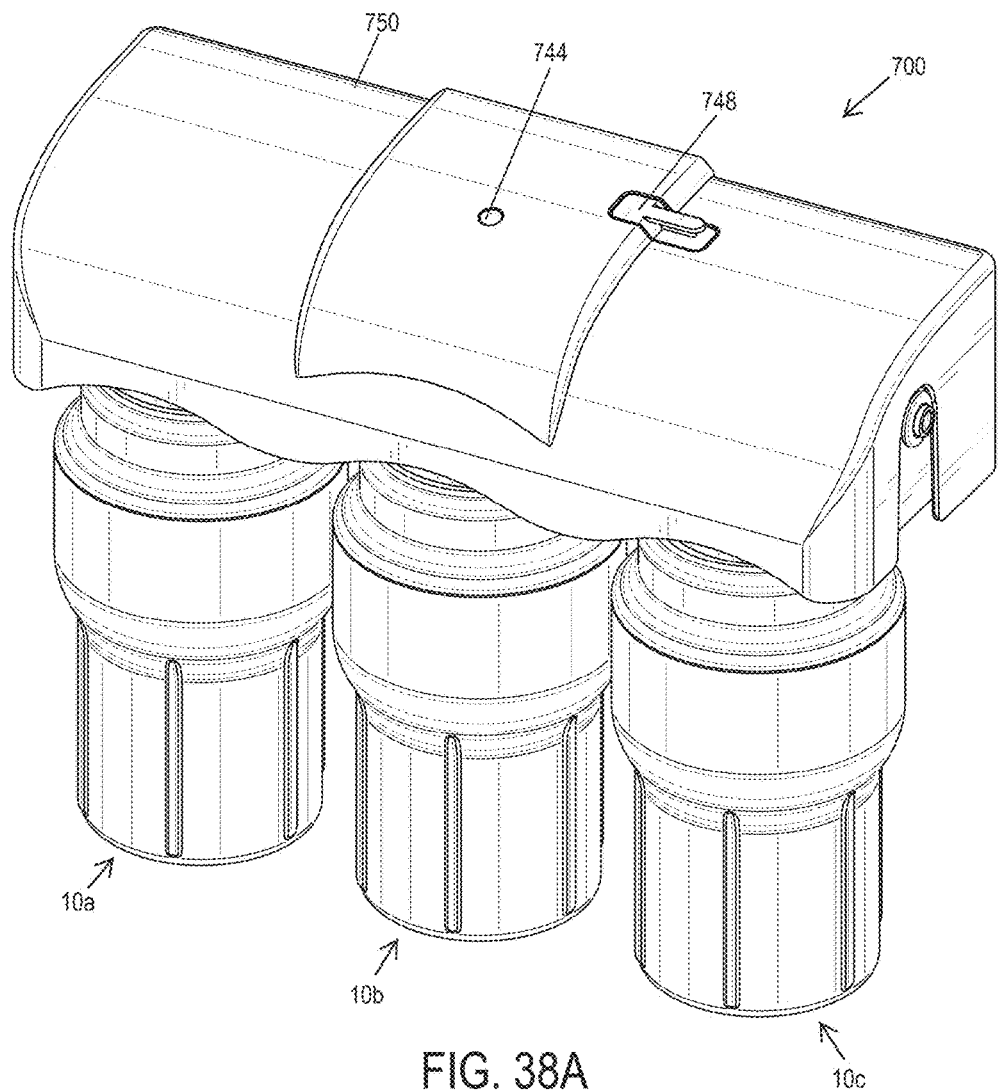
FIGS. 38A-38B are various views of a third embodiment of the present filtration systems including a manifold assembly of FIGS. 31-37D and three filter modules of FIGS. 1-7.
Figure 38B:
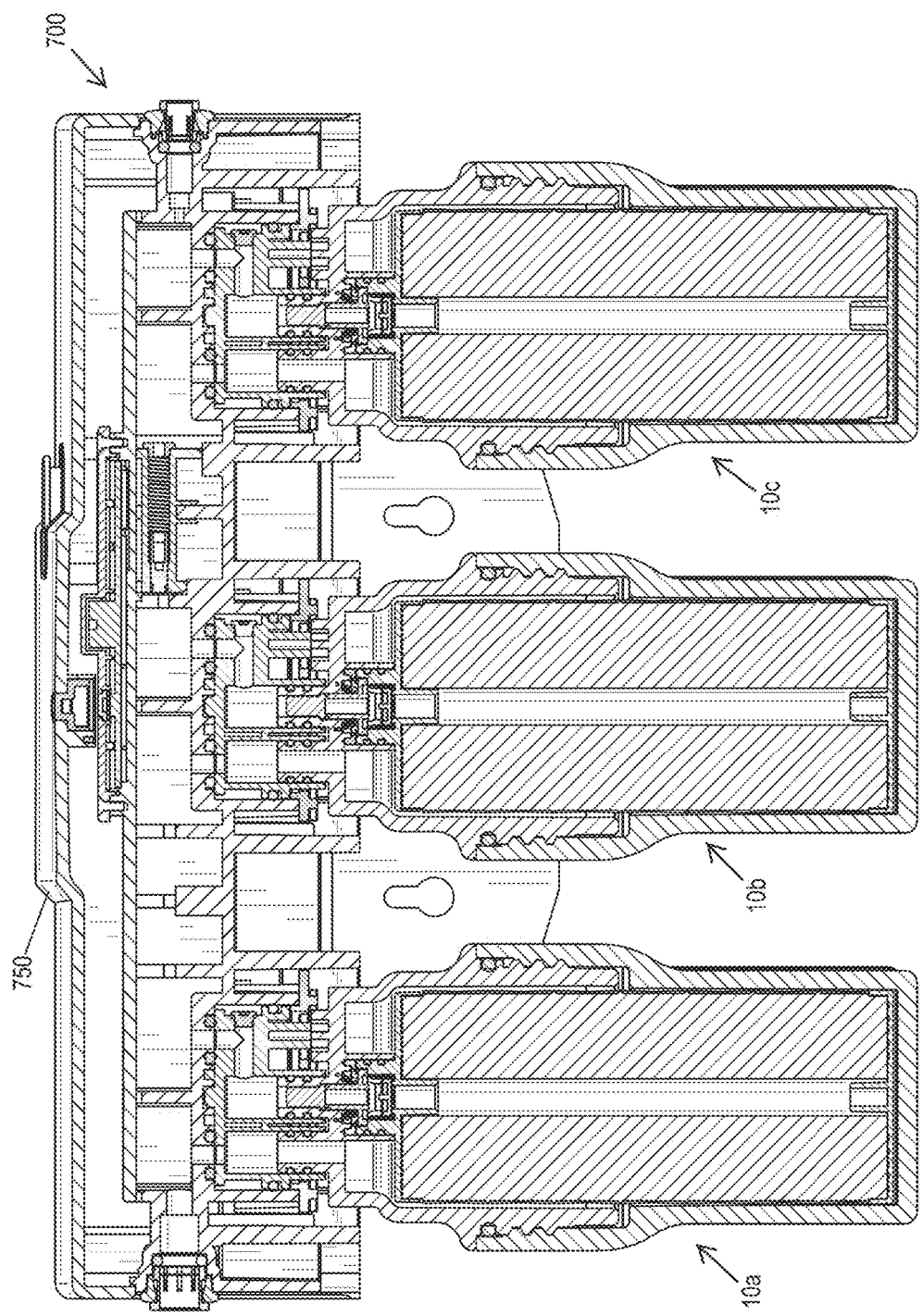

Referring now to FIGS. 30-37D, FIGS. 31-37D are various views of a third embodiment 700 of the present manifold assemblies for use with three filter modules 10a, 10b, and 10c; and FIGS. 38A-38B are various views of a third embodiment of the present filtration systems 500b that includes a manifold assembly 700 and three filter modules 10a, 10b, and 10c. FIGS. 35A, 36, 37A, and 37C show valve members 416a, 416b, and 416c in closed positions relative to valve housing 704 in which liquid is prevented from flowing between inlet 408 and outlet 412; and FIGS. 35B, 37B, 37D, and 38B show valve members 416a, 416b, and 416c in open positions relative to valve housing 704 in which liquid is permitted to flow between inlet 408 and outlet 412. In the embodiment shown, filter modules 10a, 10b, and 10c are identical to filter module 10. Manifold assembly 700 is substantially similar in many respects to manifold assemblies 400 and 600, with the primary difference being that manifold assembly 700 is configured to be coupled to three filter modules 10a, 10b, and 10c, and manifold body 704 is therefore configured to receive three valve members 416a, 416b, and 416c (e.g., identical to valve member 416). As such, similar numbers (e.g., 10, 10a, 10b, 10c; 416, 416a, 416b, 416c, etc.) are used to denote structures that are similar to corresponding structures in manifold assemblies 400 and 600 and the following description focuses primarily on the features of manifold assembly 700 that differ relative to manifold assemblies 400 and 600. In the embodiment shown, manifold body 704 includes a first hollow chamber 708 extending between opening 464a (from which water or other liquid can flow from the filter outlet of first filter module 10a) and opening 460b (through which water or other liquid can flow into the filter inlet of second filter module 10b), and includes a second hollow chamber 712 extending between opening 464b (from which water or other liquid can flow from the filter outlet of second filter module 10b) and opening 460c (through which water or other liquid can flow into the filter inlet of third filter module 10c), to permit the serial flow of water or other liquid through filter modules 10a, 10b, and 10c. As with assemblies 400 and 600, assembly 700 comprises a shroud 750 configured to be disposed over at least a portion of valve body 704, as shown. For example, in this embodiment, shroud 750 extends over substantially all of the top and front, and over portions of the back and left and right sides, of valve body 704, but does not extend over or cover the bottom of valve body 704. FIG. 30A depicts an alternate three-stage embodiment 700a that is substantially similar to assembly 700, with the exception that assembly 700a includes a shroud 750a with a shape that differs from that of shroud 750, as shown.

In the embodiment shown, manifold assembly 700 also comprises a usage meter 716 configured to detect the amount of flow through the filter units 10a, 10b, 10c, such as, for example, to alert a user when filters 206 of the filter units are scheduled to be replaced. For example, in this embodiment, usage meter 716 comprises a controller 720 (e.g., mounted on a circuit board) and a switch 724. In the embodiment shown, switch 724 comprises a movable (e.g., pivotable) member (e.g., tube) 728 disposed in chamber 712 and configured to rotate in a counterclockwise direction (when looking from inlet 408 toward outlet 412) if liquid flows from opening 464b to opening 460c. For example, in the embodiment shown, movable member 728 is pivotably coupled to rectangular end plates 730 that are configured to slide into chamber 712 such that end plates 730 are not permitted to rotate relative to the manifold housing, but do permit movable member 728 to rotate relative to the end plates and the manifold housing. In this embodiment, a spring 732 is coupled to movable member 728 and end plates 730 and configured to bias movable member toward a resting position, such that when liquid is not flowing from opening 464b to opening 464c, movable member returns to a resting position that is rotated clockwise relative to the position occupied by movable member 728 when liquid is flowing.

In this embodiment, switch 724 includes a fixed portion 734 that is fixed relative to manifold body 704, and a movable (e.g., pivotable) portion 736 that is movable (e.g., pivotable, as shown) relative to manifold body 704. In the embodiment shown, movable portion 736 of the switch is coupled to pivotable member 728 by a rigid wire 740 such that if water flows from opening 464b to opening 460c, pivotable member 728 rotates counterclockwise and pushes (via wire 740) movable member 736 upward toward fixed member 734 to close switch 724 (e.g., by bringing together magnetic or other contacts carried by movable member 736 and fixed member 734, respectively). When switch 724 is closed, controller 720 (e.g., a counter of the controller) counts up to monitor the approximate time of usage of the assembly during which liquid is flowing through the filter elements. The time of usage can be indicative of a number of gallons that have been filtered. For example, in an embodiment designed for a flow rate of about 1 gallon per minute (e.g., at average operating pressures for residential applications), and filter elements with an operating life of 500 gallons, the usage meter can be configured to alert a user to replace the filter elements after recording 500 minutes of flow through the assembly. For example, in the embodiment shown, usage meter 716 includes an LED light 744 in communication with controller 720 that can either be lighted or can change color when a predetermined period of time of usage has elapsed, to indicate to a user that the filter elements should be replaced. In the embodiment shown, usage meter 716 further includes a button 748 to permit a user to reset the counter when the filter elements are replaced (e.g., by depressing the button once or by holding down the button for a period of time, such as, for example, 2 seconds). In other embodiments, any suitable types of usage meters, switches, and/or indicators (e.g., audible) may be used. Similarly, other embodiments of single-stage filter assemblies (e.g., 200, 400) may include usage meter 716 or other usage meters. In the embodiment shown, button 748 is coupled to a battery carrier 752 that is configured to be removably inserted into an opening 756 in shroud 750, such that a battery 760 carried by battery carrier 752 extends into a receptacle 764 in body 704 and is in electrical communication with controller 720.

The structures of the present systems, assemblies, and apparatuses, such as the housing, manifold bodies, valve members, filter caps, and shrouds can be made with standard materials (e.g., plastic) using standard manufacturing techniques (e.g., injection molding), and/or are commercially available for purchase (e.g., O-rings, nipple fittings, seals, etc.).

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure, and/or connections may be substituted (e.g., threads may be substituted with press-fittings or welds). Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A filtration system, comprising:
   a filter having a passageway;
   a filter housing including a first housing portion and a second housing portion couplable to the first housing portion, the second housing portion including a connection portion having a filter inlet, a filter outlet, and a filter valve coupled to at least one of the filter inlet and the filter outlet; and
   a cap having an inner side engageable with the filter, an outer side engageable with the filter valve, a generally cylindrical outer projection including a peripheral groove configured to receive a seal, an inner projection, and a cap passageway extending through the outer projection and the inner projection to permit water to flow between the inner side and the outer side, the cap passageway having an outer cap passageway portion formed in the outer projection and an inner cap passageway portion formed in the inner projection, the outer cap passageway portion including a first transverse dimension and a second transverse dimension that is smaller than and inward of the first transverse dimension;
   wherein the filter and the cap are positioned within a filter chamber formed by the first housing portion and the second housing portion;
   wherein the filter valve includes a valve body and a plunger, wherein the valve body is fixed relative to the second housing portion, and the plunger is movable between a closed position in which liquid is prevented from flowing through the filter valve, and an open position in which liquid is permitted to flow through the filter valve, and wherein the filter valve is biased to the closed position;
   wherein the outer projection of the cap is configured to engage the plunger to open the filter valve when the filter and the cap are positioned within the housing chamber;
   wherein the valve body includes a guide slot and the plunger includes a lateral projection positionable in the guide slot, the guide slot and the lateral projection configured to permit the plunger to slide linearly along a longitudinal axis of the valve body, and wherein the guide slot is configured to allow a flow of liquid therethrough when the filter valve is in the open position.

2. The filtration system of claim 1, wherein the cap includes a plurality of ribs positioned within the outer cap passageway portion, the plurality of ribs defining the second transverse dimension.

3. The filtration system of claim 1, wherein the cap passageway is in fluid communication with the passageway of the filter so that all of a liquid entering the passageway of the filter exits the filter through the cap passageway.

4. The filtration system of claim 1, further comprising a manifold assembly comprising:
 a manifold body having a manifold inlet, a manifold outlet, and a filter connection portion configured to engage the filter housing to couple the filter housing to the manifold assembly; and
 a valve member movably coupled to the manifold body, the valve member having a valve outlet configured to communicate with the filter inlet of the second housing portion, and a valve inlet configured to communicate with the filter outlet of the second housing portion, the valve member configured to be movable between a closed position in which fluid communication is substantially prevented between the manifold inlet and the valve outlet of the valve member, and an open position in which fluid communication is permitted between the manifold inlet and the valve outlet of the valve member;
 where the filter connection portion is configured to resist removal of the filter housing from the manifold assembly when the valve member is in the open position.

5. The filtration system of claim 4, wherein the valve member is rotatably coupled to the manifold body, and the valve member is configured to engage the filter housing such that rotation of the filter housing by ninety degrees or less relative to the manifold body simultaneously couples the filter housing to the manifold assembly and rotates the valve member to the open position.

6. A filter assembly for use with a filter housing having a filter chamber, the filter housing having a connection portion with an inner side and an outer side, the outer side configured to face away from the filter chamber, the outer side having a filter inlet and a filter outlet, and a filter valve coupled to at least one of the filter inlet and the filter outlet, the filter valve biased toward a closed configuration in which fluid communication is substantially prevented through the filter valve, where the filter valve includes a valve body having a bore and a plunger, the valve body being fixed relative to the housing, the filter assembly comprising:
 a filter configured to be disposed in the filter chamber; and
 a filter cap engagable with the filter and configured to be positioned between the plunger of the filter valve and the filter to maintain the filter valve in an open position such that fluid communication is permitted through the filter valve between the filter chamber and at least one of the filter inlet and the filter outlet, the filter cap comprising:
 an outer side including an outer projection including an engagement portion configured to engage the connection portion to move the filter valve into the open position,
 an inner side configured to receive the filter and including an inner projection, and
 a passageway extending through the outer projection and the inner projection to permit water to flow between the inner side and the outer side, the passageway having an outer passageway portion formed in the outer projection and an inner passageway portion formed in the inner projection, the outer passageway portion including a first transverse dimension adapted to receive the plunger and a second transverse dimension that is smaller than and inward of the first transverse dimension and adapted to receive the valve body.

7. The filter assembly of claim 6, wherein the cap includes a plurality of ribs positioned within the outer passageway portion, the plurality of ribs defining the second transverse dimension.

8. The filter assembly of claim 6, wherein the outer projection of the cap is configured to engage the valve body to open the filter valve when the filter and the cap are positioned within the housing chamber.

9. The filter assembly of claim 6, wherein the passageway of the cap is in fluid communication with a passageway of the filter so that all of a liquid entering the passageway of the filter exits through the passageway of the cap.

10. The filter assembly of claim 6, wherein the outer projection includes a peripheral groove configured to receive a seal.

* * * * *